(12) United States Patent
Aiba et al.

(10) Patent No.: US 9,686,758 B2
(45) Date of Patent: Jun. 20, 2017

(54) CALCULATING POWER HEADROOM BASED ON PATHLOSS AND SUBFRAME SETS

(71) Applicant: Sharp Kabushiki Kaisha, Osaka-shi, Osaka (JP)

(72) Inventors: Tatsushi Aiba, Osaka (JP); Shoichi Suzuki, Osaka (JP); Kazunari Yokomakura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/415,185

(22) PCT Filed: Jun. 30, 2014

(86) PCT No.: PCT/JP2014/067385
§ 371 (c)(1),
(2) Date: Jan. 16, 2015

(87) PCT Pub. No.: WO2015/005162
PCT Pub. Date: Jan. 15, 2015

(65) Prior Publication Data
US 2015/0181539 A1 Jun. 25, 2015

(30) Foreign Application Priority Data

Jul. 9, 2013 (JP) .................................. 2013-143429
Jul. 17, 2013 (JP) .................................. 2013-148164

(51) Int. Cl.
| | |
|---|---|
| *H04W 52/36* | (2009.01) |
| *H04J 11/00* | (2006.01) |
| *H04L 5/14* | (2006.01) |
| *H04W 52/18* | (2009.01) |
| *H04W 52/24* | (2009.01) |
| *H04W 52/34* | (2009.01) |

(Continued)

(52) U.S. Cl.
CPC .......... *H04W 52/365* (2013.01); *H04J 11/00* (2013.01); *H04L 5/14* (2013.01); *H04W 52/18* (2013.01);

(Continued)

(58) Field of Classification Search
CPC ............ H04W 52/365; H04W 52/243; H04W 52/18; H04W 52/34; H04W 52/36;

(Continued)

(56) References Cited

U.S. PATENT DOCUMENTS

2014/0161003 A1* 6/2014 Han .................... H04W 52/146
370/280

FOREIGN PATENT DOCUMENTS

WO 2010/091425 A2 8/2010

OTHER PUBLICATIONS

"UL Power Control Based Interference Mitigation for eIMTA," 3GPP TSG RAN WG1 Meeting #73, R1-132351, May 20-24, 2013, pp. 1-14.

(Continued)

*Primary Examiner* — Ian N Moore
*Assistant Examiner* — Brian T Le
(74) *Attorney, Agent, or Firm* — Keating & Bennett, LLP

(57) ABSTRACT

A terminal apparatus that communicates with a base station apparatus, according to one embodiment of the present invention, receives information indicating a subframe in a first subframe set and a subframe in a second subframe set, using higher-layer signaling, computes a power headroom using a first set of parameters and an estimated value of a downlink pathloss that is calculated in the terminal apparatus, if a certain subframe belongs to the first subframe set, to compute the power headroom for the certain subframe, and computes the power headroom using a second set of parameters and the estimated value of the downlink pathloss, if the certain subframe belongs to the second subframe set, in which a first parameter by which the estimated value of the downlink pathloss is multiplied is included in the first set of parameters, and a second parameter by which the estimated value of the downlink pathloss is multiplied is included in the second set of parameters.

8 Claims, 18 Drawing Sheets

(51) Int. Cl.
  *H04W 72/04* (2009.01)
  *H04L 5/00* (2006.01)
(52) U.S. Cl.
  CPC ......... *H04W 52/243* (2013.01); *H04W 52/34* (2013.01); *H04W 72/04* (2013.01); *H04L 5/0053* (2013.01)
(58) Field of Classification Search
  CPC ............ H04W 52/146; H04W 52/367; H04W 52/325; H04W 72/0413; H04W 72/04; H04W 72/0406; H04W 72/1284; H04L 5/0053; H04L 5/14; H04L 5/001
  See application file for complete search history.

(56) References Cited

OTHER PUBLICATIONS

"On Standardization Impact of TDD UL-DL Adaptation," 3GPP TSG-RAN WG1 #69, R1-122016, May 21-25, 2012, pp. 1-3.
"UL Power Control Based Interference Mitigation for eIMTA," GPP TSG RAN WG1 Meeting #73, R1-132351, May 20-24, 2013, pp. 1-14.
Yokomakura et al., "Terminal Apparatus, Base Station Apparatus, Communication Method and Integrated Circuit", U.S. Appl. No. 14/902,895, filed Jan. 5, 2016.
Aiba et al. "Terminal Apparatus, Base Station Apparatus, Communications Method and Integrated Circuit", U.S. Appl. No. 14/902,896, filed Jan. 5, 2016.

* cited by examiner

FIG. 9

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 11

| CONDITION | FIRST CONFIGURATION | SECOND CONFIGURATION |
|---|---|---|
| (a) | D | D |
| (b) | U | U OR D |
| (c) | S | S OR D |

FIG. 12

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | 6 | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 13

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | 6 | 6 | | 4 | | | 6 |
| 2 | 6 | | | | | | | | 6 | 6 |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 14

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 18

| PH | Power Headroom Level | Measured quantity value (dB) |
|---|---|---|
| 0 | Power_Headroom_0 | $-23 \leq PH \leq -22$ |
| 1 | Power_Headroom_1 | $-22 \leq PH \leq -21$ |
| 2 | Power_Headroom_2 | $-21 \leq PH \leq -20$ |
| 3 | Power_Headroom_3 | $-20 \leq PH \leq -19$ |
| ... | ... | ... |
| 60 | Power_Headroom_60 | $37 \leq PH \leq 38$ |
| 61 | Power_Headroom_61 | $38 \leq PH \leq 39$ |
| 62 | Power_Headroom_62 | $39 \leq PH \leq 40$ |
| 63 | Power_Headroom_63 | $PH \geq 40$ |

CALCULATING POWER HEADROOM BASED ON PATHLOSS AND SUBFRAME SETS

TECHNICAL FIELD

The present invention relates to a terminal apparatus, a base station apparatus, a communication method, and an integrated circuit.

This application claims the benefit of Japanese Priority Patent Application JP 2013-143429 filed Jul. 9, 2013, and Japanese Priority Patent Application JP 2013-148164 filed Jul. 17, 2013, the entire contents of each of which are incorporated herein by reference.

BACKGROUND ART

A radio access method and a radio network for cellular mobile communication (hereinafter referred to as "Long Term Evolution (LTE)", or "Evolved Universal Terrestrial Radio Access (EUTRA)") are under study in the 3rd Generation Partnership Project (3GPP). In LTE, a base station apparatus is also referred to as an evolved NodeB (eNodeB), and a terminal apparatus is also referred to as user equipment (UE). LTE is a cellular communication system in which the landscape is divided, in a cellular pattern, into multiple cells, each served by a base station apparatus. A single base station apparatus may manage multiple cells.

Here, LTE supports Time Division Duplex (TDD). LTE that employs a TDD mode is also referred to as TD-LTE or LTE TDD. TDD is a technology that enables full duplex communication in a single frequency band by time-multiplexing an uplink signal and a downlink signal. Furthermore, LTE supports Frequency Division Duplex (FDD).

Furthermore, application of an interference reduction technology and a traffic adaptation technology (DL-UL Interference Management and Traffic Adaptation) to TD-LTE is under study in the 3GPP. That is, the traffic adaptation technology is a technology that changes a ratio of an uplink resource to a downlink resource according to uplink traffic and downlink traffic. The traffic adaptation technology is also referred to as a dynamic TDD.

As a method of realizing the traffic adaptation, a method of using a flexible subframe is proposed in NPL 1. The base station apparatus can transmit a downlink signal or receive an uplink signal in the flexible subframe. The terminal apparatus regards the flexible subframe as a downlink subframe as long as the base station apparatus does not instruct the terminal apparatus to transmit an uplink signal.

Furthermore, as an interference reduction technology, Transmission Power Control (TPC) for uplink is under study in NPL 2. For example, study on parameters associated with the transmission power control for uplink is described in NPL 2.

CITATION LIST

Non-Patent Literature

NPL 1: "On standardization impact of TDD UL-DL adaptation", R1-122016, 3GPP TSG-RAN WG1 Meeting #69, 21-25 May 2012

NPL 2: "UL power control based interference mitigation for eIMTA", R1-132351, 3GPP TSG-RAN WG1 Meeting #73, 20-24 May 2013

DISCLOSURE OF THE INVENTION

Problems to be Solved by the Invention

However, a specific procedure is not described that is used when the terminal apparatus performs processing associated with transmission power in the radio communication system. For example, a specific procedure is not described that is used when the terminal apparatus executes the transmission power control. Furthermore, for example, a specific procedure is not described when the terminal apparatus executes Power Head Room (PHR) reporting.

Means for Solving the Problems (1) A terminal apparatus according to one embodiment of the present invention is a terminal apparatus that communicates with a base station apparatus, the terminal apparatus performing: receiving information indicating a subframe in a first subframe set and a subframe in a second subframe set, using higher-layer signaling; computing a power headroom using a first set of parameters and an estimated value of a downlink pathloss that is calculated in the terminal apparatus, if a certain subframe belongs to the first subframe set, to compute the power headroom for the certain subframe; and computing the power headroom using a second set of parameters and the estimated value of the downlink pathloss, if the certain subframe belongs to the second subframe set, in which a first parameter by which the estimated value of the downlink pathloss is multiplied is included in the first set of parameters, and a second parameter by which the estimated value of the downlink pathloss is multiplied is included in the second set of parameters.

(2) In the terminal apparatus described above, a serving cell that is used to calculate the estimated value of the downlink pathloss may be configured using the higher-layer signaling.

(3) In the terminal apparatus described above, in a case where transmission on a dynamically-scheduled physical uplink shared channel is performed in the certain subframe for a certain serving cell, the power headroom may be computed using the first set of parameters and the estimated value of the downlink pathloss, or the second set of parameters and the estimated value of the downlink pathloss.

(4) A base station apparatus according to another embodiment of the present invention is a base station apparatus that communicates with a terminal apparatus, the base station apparatus performing: transmitting information indicating a subframe in a first subframe set and a subframe in a second subframe set, using higher-layer signaling; and receiving a power headroom for a certain subframe, in which the power headroom is computed using a first set of parameters and an estimated value of a downlink pathloss that is calculated in the terminal apparatus if the certain subframe belongs to the first subframe set, in which the power headroom is computed using a second set of parameters and the estimated value of the downlink pathloss that is calculated in the terminal apparatus if the certain subframe belongs to the second subframe set, and in which a first parameter by which the estimated value of the downlink pathloss is multiplied is included in the first set of parameters, and a second parameter by which the estimated value of the downlink pathloss is multiplied is included in the second set of parameters.

(5) A communication method according to a further embodiment of the present invention is a communication method for use in a terminal apparatus that communicates with a base station apparatus, the method including: receiving information indicating a subframe in a first subframe set and a subframe in a second subframe set, using higher-layer signaling; computing a power headroom using a first set of parameters and an estimated value of a downlink pathloss that is calculated in the terminal apparatus, if a certain subframe belongs to the first subframe set, to compute the power headroom for the certain subframe; and computing the power headroom using a second set of parameters and the estimated value of the downlink pathloss, if the certain subframe belongs to the second subframe set, in which a first parameter by which the estimated value of the downlink pathloss is multiplied is included in the first set of parameters, and a second parameter by which the estimated value of the downlink pathloss is multiplied is included in the second set of parameters.

(6) A communication method according to a still further embodiment of the present invention is a communication method for use in a base station apparatus that communicates with a terminal apparatus, the method including: transmitting information indicating a subframe in a first subframe set and a subframe in a second subframe set, using higher-layer signaling; and receiving a power headroom for a certain subframe, in which the power headroom is computed using a first set of parameters and an estimated value of a downlink pathloss that is calculated in the terminal apparatus if the certain subframe belongs to the first subframe set, in which the power headroom is computed using a second set of parameters and the estimated value of the downlink pathloss that is computed in the terminal apparatus if the certain subframe belongs to the second subframe set, and in which a first parameter by which the estimated value of the downlink pathloss is multiplied is included in the first set of parameters, and a second parameter by which the estimated value of the downlink pathloss is multiplied is included in the second set of parameters.

(7) An integrated circuit according to a further embodiment of the present invention is an integrated circuit that is mounted into a terminal apparatus that communicates with a base station apparatus, the circuit causing the terminal apparatus to perform: a function of receiving information indicating a subframe in a first subframe set and a subframe in a second subframe set, using higher-layer signaling; and a function of computing a power headroom using a first set of parameters and an estimated value of a downlink pathloss that is calculated in the terminal apparatus, if a certain subframe belongs to the first subframe set, to compute the power headroom for the certain subframe and computing the power headroom using a second set of parameters and the estimated value of the downlink pathloss, if the certain subframe belongs to the second subframe set, in which a first parameter by which the estimated value of the downlink pathloss is multiplied is included in the first set of parameters, and a second parameter by which the estimated value of the downlink pathloss is multiplied is included in the second set of parameters.

(8) An integrated circuit according to a further embodiment of the present invention is an integrated circuit that is mounted into a base station that communicates with a terminal apparatus, the circuit causing the base station apparatus to perform: a function of transmitting information indicating a subframe in a first subframe set and a subframe in a second subframe set, using higher-layer signaling; and a function of receiving a power headroom for a certain subframe, in which the power headroom is computed using a first set of parameters and an estimated value of a downlink pathloss that is calculated in the terminal apparatus if the certain subframe belongs to the first subframe set, in which the power headroom is computed using a second set of parameters and the estimated value of the downlink pathloss that is calculated in the terminal apparatus if the certain subframe belongs to the second subframe set, and in which a first parameter by which the estimated value of the downlink pathloss is multiplied is included in the first set of parameters, and a second parameter by which the estimated value of the downlink pathloss is multiplied is included in the second set of parameters.

Effects of the Invention

According to the embodiments of the present invention, a terminal apparatus can efficiently execute processing associated with transmission power.

BRIEF DESCRIPTION OF THE DRAWINGS

FIG. 9 is a table illustrating an example of an uplink-downlink configuration.

FIG. 11 is a diagram illustrating a relationship between a subframe that is designated by a first configuration and a subframe that is designated by a second configuration.

FIG. 12 is a diagram illustrating an example of a correspondence between a subframe n in which a PDCCH/EPDCCH/PHICH is arranged and a subframe n+k in which a PUSCH that the PDCCH/EPDCCH/PHICH corresponds to is arranged.

FIG. 13 is a diagram illustrating an example of a correspondence between the subframe n in which a PHICH is arranged and a subframe n+k in which the PUSCH that the PHICH corresponds to is arranged.

FIG. 14 is a diagram illustrating an example of a correspondence between the subframe n in which a PUSCH is arranged, and the subframe n+k in which a PHICH that the PUSCH corresponds to is arranged.

FIG. 15 is a diagram illustrating an example of a correspondence between a subframe n−k in which a PDSCH is arranged and the subframe n in which a HARQ-ACK that the PDSCH corresponds to is transmitted.

FIG. 18 is a diagram illustrating an example of a power headroom being reported and a corresponding power headroom level.

MODE FOR CARRYING OUT THE INVENTION

The present embodiment is applicable to a single cell that is set to serve a terminal apparatus. Furthermore, the present embodiment may be applicable to each of multiple cells that are set to serve the equipment. Furthermore, the present embodiment may be applicable to some of multiple cells that are set to serve the equipment. Here, a technology in which the terminal apparatus performs communication in multiple cells is called a cell aggregation or a carrier application. Here, a cell that is set to serve the equipment is also called a serving cell.

Here, one primary cell and one or more secondary cells are included in the multiple cells that are set to serve the equipment. The primary cell may include a cell on which an initial connection establishment procedure is performed. Furthermore, the primary cell may include a cell that is instructed to serve as a primary cell in a handover procedure. Furthermore, at the time when a radio resource control (RRC) connection is established or after the RRC connection is established, the secondary cell may be set.

Furthermore, the secondary cell may be activated based on information that is transmitted from a base station apparatus. The primary cell may be always activated.

In a radio communication system according to the present embodiment, at least, a Time Division Duplex (TDD) mode is applied (supported). Furthermore, in a case where the cell aggregation is applied, the TDD mode may be applied in each of the multiple cells. Furthermore, in a case where a cell to which the TDD mode is applied and a cell to which a Frequency Division Duplex (FDD) mode is applied are aggregated, the present embodiment may be applied to the cell to which the TDD mode is applied.

Furthermore, the present embodiment may be applied to the terminal apparatus, to which the base station apparatus sets a dynamic TDD (setting relating to the dynamic TDD (or a transmission mode)) to be applied.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
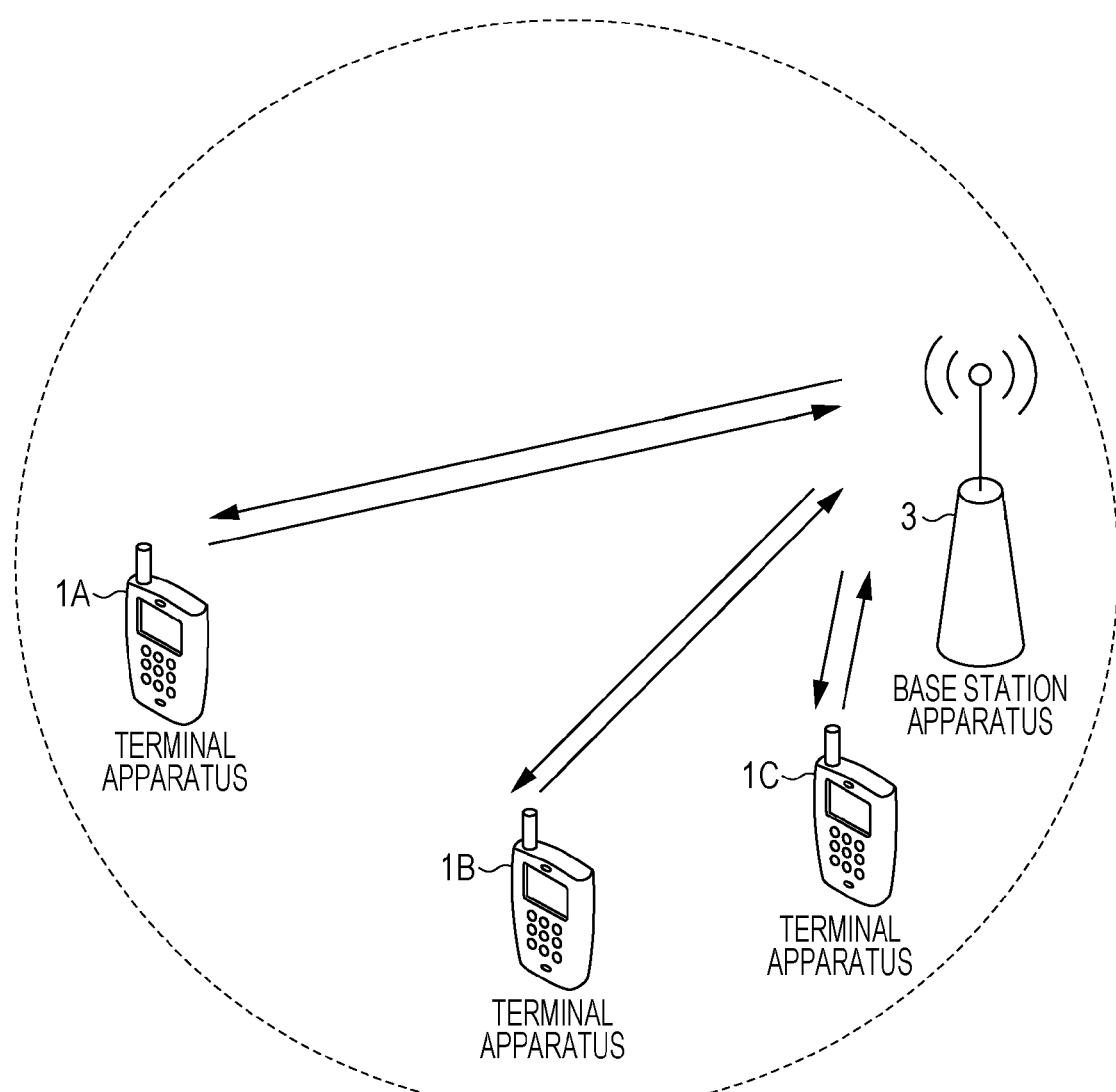
FIG. 1 is a diagram illustrating an example of a radio communication system.

FIG. 1 is a diagram illustrating an example of the radio communication system according to the present embodiment. As illustrated in FIG. 1, the radio communication system includes terminal apparatuses 1A to 1C and a base station apparatus 3. The terminal apparatuses 1A to 1C are also referred to below as a terminal apparatus 1.

In FIG. 1, uplink physical channels that are used in radio communication for uplink from the terminal apparatus 1 to the base station apparatus 3 are as follows. The uplink physical channel is used to transmit information that is output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). At this point, the uplink control information includes a positive acknowledgement (ACK) or a negative acknowledgement (NACK) (ACK/NACK) of downlink data (downlink transport block, Downlink-Shared Channel (DL-SCH)). The ACK/NACK with respect to the downlink data is also called HARQ-ACK or HARQ feedback.

Furthermore, the uplink control information includes Channel State Information (CSI) for downlink. Furthermore, the uplink control information includes a Scheduling Request (SR) that is used for requesting Uplink-Shared channel (UL-SCH) resources.

The PUSCH is used to transmit uplink data (uplink transport block, UL-SCH). Furthermore, the PUSCH may be used to transmit the ACK/NACK and/or the channel state information, along with the uplink data. Furthermore, the PUSCH may be used to transmit only the uplink control information.

Furthermore, the PUSCH is used to transmit an RRC message. The RRC message is a piece of information/signal that is processed in a Radio Resource Control (RRC) layer. Furthermore, the PUSCH is used to transmit a MAC control element (CE). Here, the MAC CE is a piece of information/signal that is processed in a Medium Access Control (MAC) layer.

For example, a power headroom may be included in the MAC CE and may be reported through the PUSCH. That is, a MAC CE field may be used to indicate a power headroom level.

The PRACH is used to transmit a random access preamble.

Furthermore, in the radio communication for uplink, an Uplink Reference Signal (UL RS) is used as an uplink physical signal. The uplink physical signal is not used to transmit information that is output from a higher layer, but is used by a physical layer. Here, a Demodulation Reference Signal (DMRS) and a Sounding Reference Signal (SRS) are included in the uplink reference signal.

The DMRS is associated with transmission on the PUSCH or the PUCCH. For example, the base station apparatus 3 uses the DMRS to perform channel reconfiguration of the PUSCH or the PUCCH. The SRS is not associated with transmission on the PUSCH or the PUCCH. For example, the base station apparatus 3 uses the SRS to measure an uplink channel state.

In FIG. 1, downlink physical channels that are used in the radio communication for downlink from the base station apparatus 3 to the terminal apparatus 1 are as follows. The downlink physical channel is used to transmit information that is output from a higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

The PBCH is used to broadcast a Master Information Block (MIB) (Broadcast Channel (BCH)) that is used in common in the terminal apparatus 1. The PCFICH is used to transmit information that designates a domain (for example, the number of OFDM symbols) that is used in transmission on the PDCCH.

The PHICH is used to transmit the ACK/NACK with respect to the uplink data that the base station apparatus 3 receives. That is, the PHICH is used to transmit an HARQ indicator (HARQ feedback) that indicates the ACK/NACK with respect to the uplink data.

The PDCCH and the EPDCCH are used to transmit Downlink Control Information (DCI). Here, multiple DCI formats are defined for transmission of the downlink control information. That is, a field for the downlink control information is defined in the DCI format and is mapped to information bit.

For example, a DCI format 1A that is used for scheduling of one PDSCH (transmission of one downlink transport block) in one cell is defined as the DCI format for the downlink.

For example, information relating to PDSCH resource allocation, information relating to a Modulation and Coding Scheme (MCS) for the PDSCH, and the downlink control information such as a TPC command for the PUCCH are included in the DCI format for the downlink. Here, the DCI format for the downlink is also referred to as a downlink grant (or a downlink assignment).

For example, a DCI format 0 that is used for scheduling of one PUSCH (transmission of one uplink transport block) in one cell is defined as the DCI format for the uplink.

For example, information relating to PUSCH resource allocation, information relating to the MCS for the PUSCH, and the downlink control information such as the TPC command for the PUSCH are included in the DCI format for the downlink. The DCI format for the uplink is also referred to as an uplink grant (or an uplink assignment).

In a case where a PDSCH resource is scheduled using the downlink assignment, the terminal apparatus 1 receives the downlink data, on the scheduled PDSCH. Further, in a case where a PUSCH resource is scheduled using the uplink grant, the terminal apparatus 1 transmits the uplink data and/or the uplink control information, on the scheduled PUSCH.

The PDSCH is used to transmit the downlink data (the downlink transport block, DL-SCH). Furthermore, the PDSCH is used to transmit a system information block type-1 message. The system information block type-1 message is cell-specific (specific to a cell) information.

Furthermore, the PDSCH is used to transmit a system information message. The system information message includes a system information block X other than the system information block type-1. The system information message is cell-specific (specific to a cell) information.

Furthermore, the PDSCH is used to transmit the RRC message. Here, the RRC message that is transmitted from the base station apparatus 3 may be common to the multiple terminal apparatuses 1 with the cell. Furthermore, the RRC message that is transmitted from the base station apparatus 3 may be a message (referred to as dedicated signaling) dedicated to a certain terminal apparatus 1. That is, user equipment-specific (specific to user equipment) information is transmitted using the message dedicated to a certain terminal apparatus 1. Furthermore, the PDSCH is used to transmit the MAC CE.

Here, the RRC message and/or the MAC CE are also referred to as higher-layer signaling.

Furthermore, in the radio communication for downlink, a Synchronization signal (SS) and a Downlink Reference Signal (DL RS) are used as downlink reference signals. The downlink physical signal is not used to transmit information that is output from a higher layer, but is used by a physical layer.

The synchronization signal is used in order for the terminal apparatus 1 to be synchronized to a frequency domain and a time domain for downlink. Furthermore, the downlink reference signal is used in order for the terminal apparatus 1 to perform the channel reconfiguration of the downlink physical channel. For example, the downlink reference signal is used for the terminal apparatus 1 to compute downlink channel state information.

Here, a Cell-specific Reference Signal (CRS), a UE-specific Reference Signal (URS) associated with the PDSCH, a Demodulation Reference Signal (DMRS) associated with the EPDCCH, a Non-Zero Power Channel State Information-Reference Signal (NZPCSI-RS), and a Zero Power Channel State Information-Reference Signal (ZP CSI-RS) are included in the downlink reference signal.

The CRS is transmitted in an entire band for a subframe, and is used to perform demodulation of the PBCH/PDCCH/PHICH/PCFICH/PDSCH. The URS associated with the PDSCH is transmitted in a subframe and in a band that are used in transmission on the PDSCH to which the URS relates, and is used to perform the demodulation of the PDSCH to which the URS relates.

The DMRS associated with the EPDCCH is transmitted in a subframe and in a band that are used in transmission on the EPDCCH to which the DMRS relates. The DMRS is used to perform the demodulation of the EPDCCH to which the DMRS relates.

An NZP CSI-RS resource is set by the base station apparatus 3. For example, the terminal apparatus 1 performs signal measurement (channel measurement) using the NZP CSI-RS. A ZP CSI-RS resource is set by the base station apparatus 3. With a zero output, the base station apparatus 3 transmits the ZP CSI-RS. For example, the terminal apparatus 1 performs interference measurement on a resource that the NZP CSI-RS corresponds to.

Here, the downlink physical channel and the downlink physical signal are collectively also referred to as a downlink signal. Furthermore, the uplink physical channel and the uplink physical signal are collectively also referred to as an uplink signal. Furthermore, the downlink physical channel and the uplink physical channel are collectively also referred to as a physical channel. Furthermore, the downlink physical signal and the uplink physical signal are collectively also referred to as a physical signal.

Furthermore, a BCH, a UL-SCH and a DL-SCH are transport channels. A channel that is used in a MAC layer is referred to as a transport channel. Furthermore, a unit of the transport channel that is used in the MAC layer is also referred to as a Transport Block (TB), or a MAC Protocol Data Unit (PDU). The transport block is a unit in which the MAC layer delivers data to the physical layer. In the physical layer, the transport block is mapped to a codeword, and coding processing and the like are performed for every codeword.

Figure 2:
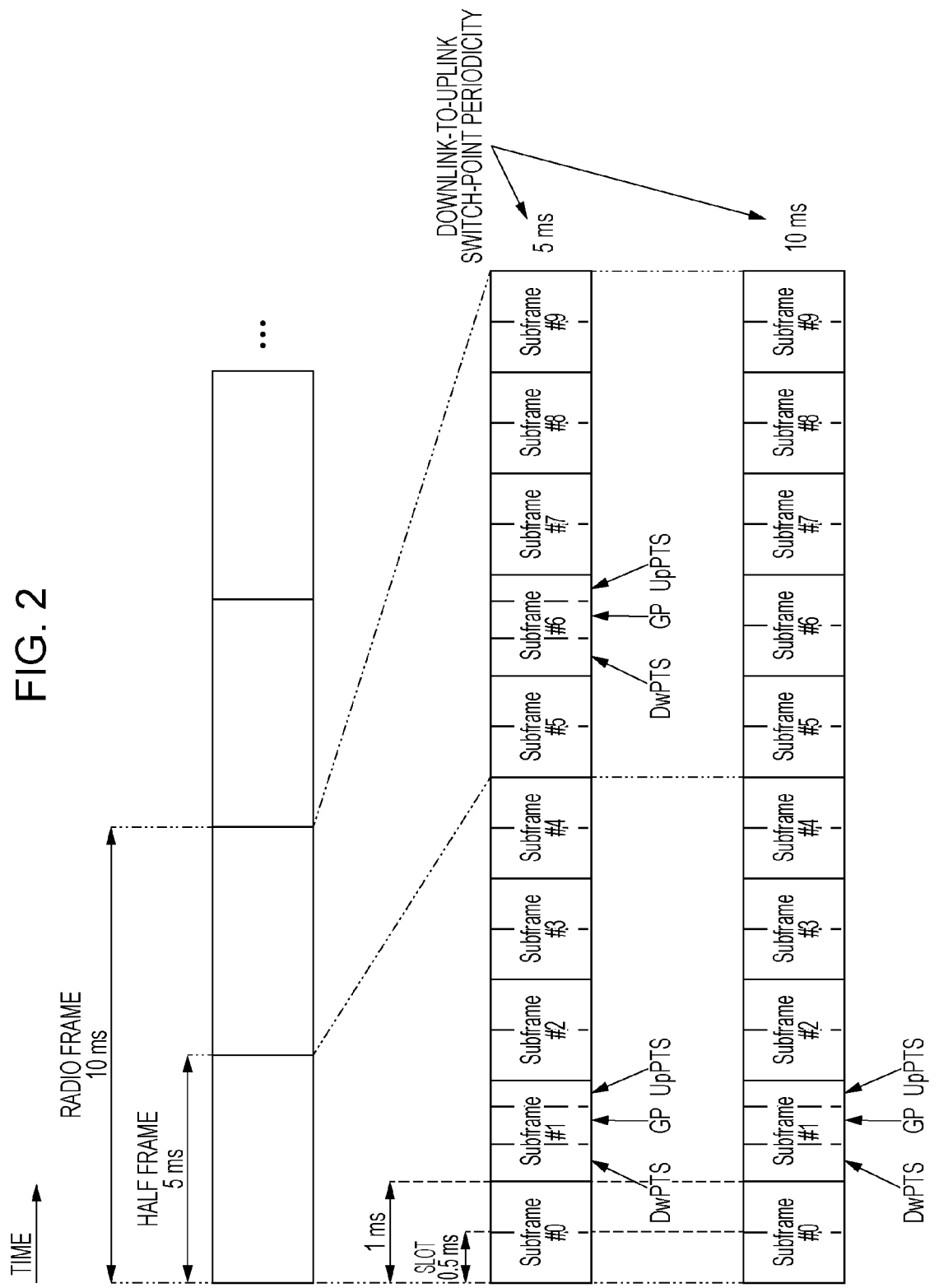
FIG. 2 is a diagram illustrating a configuration example of a radio frame.

FIG. 2 is a diagram illustrating a configuration example of a radio frame according to the present embodiment. For example, each radio frame is 10 ms in length. Furthermore, each half frame is 5 ms in length. Each subframe is 1 ms in length, and is defined by two consecutive slots. Each slot is 0.5 ms in length. The i-th subframe within the radio frame is configured from the (2×i)-th slot and the (2×i+1)-th slot. To sum up, 10 subframes are used at intervals of 10 ms.

According to the present embodiment, three types of subframes are defined as follows.

A downlink subframe (first subframe)
An uplink subframe (second subframe)
A special subframe (third subframe)

The downlink subframe is a subframe reserved for downlink transmission. Furthermore, the uplink subframe is a subframe reserved for uplink transmission. Furthermore, the special subframe is configured from three fields. The three fields are a Downlink Pilot Time Slot (DwPTS), a Guard Period (GP), and an Uplink Pilot Time Slot (UpPTS). A single radio frame is at least configured from the downlink subframe, the uplink subframe, and the special subframe.

A sum of lengths of the DwPTS, the GP, and the UpPTS is 1 ms. The DwPTS is a slot reserved for the downlink transmission. The UpPTS is a slot reserved for the uplink transmission. The GP is a slot in which the downlink transmission and the uplink transmission are not performed.

Furthermore, in the radio frame, 5-ms downlink-to-uplink switch-point periodicity and 10-ms downlink-to-uplink switch-point periodicity are supported.

Figure 3:
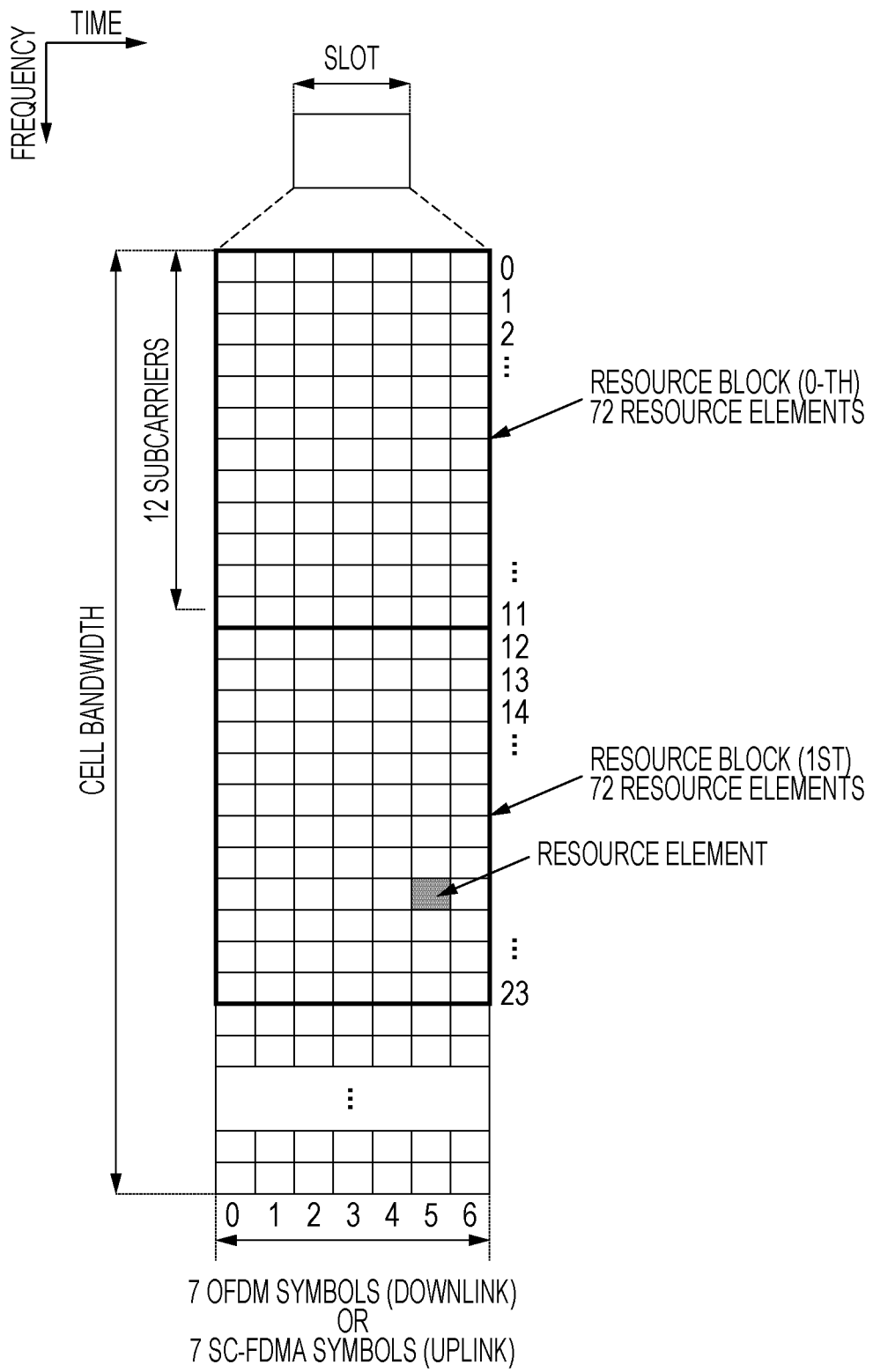
FIG. 3 is a diagram illustrating a configuration example of a slot.

FIG. 3 is a diagram illustrating a configuration example of a slot according to the present invention. The physical signal or the physical channel that is transmitted in each slot is expressed by a resource grid. In the downlink, the resource grid is defined by multiple subcarriers and multiple OFDM symbols. In the uplink, the resource grid is defined by multiple subcarriers and multiple SC-FDMA symbols.

Here, the number of subcarriers that make up one slot depends on a cell bandwidth. Furthermore, the number of OFDM symbols or SC-FDMA symbols that make up one slot is 7. Furthermore, each element within the resource grid is also referred to as a resource element.

A resource block is used for expressing mapping to the resource element of a certain physical channel (for example, the PDSCH, the PUSCH, and the like). For example, one physical resource block is defined by seven consecutive OFDM symbols or SC-FDMA symbols in the time domain and 12 consecutive subcarriers in the frequency domain.

Figure 4:
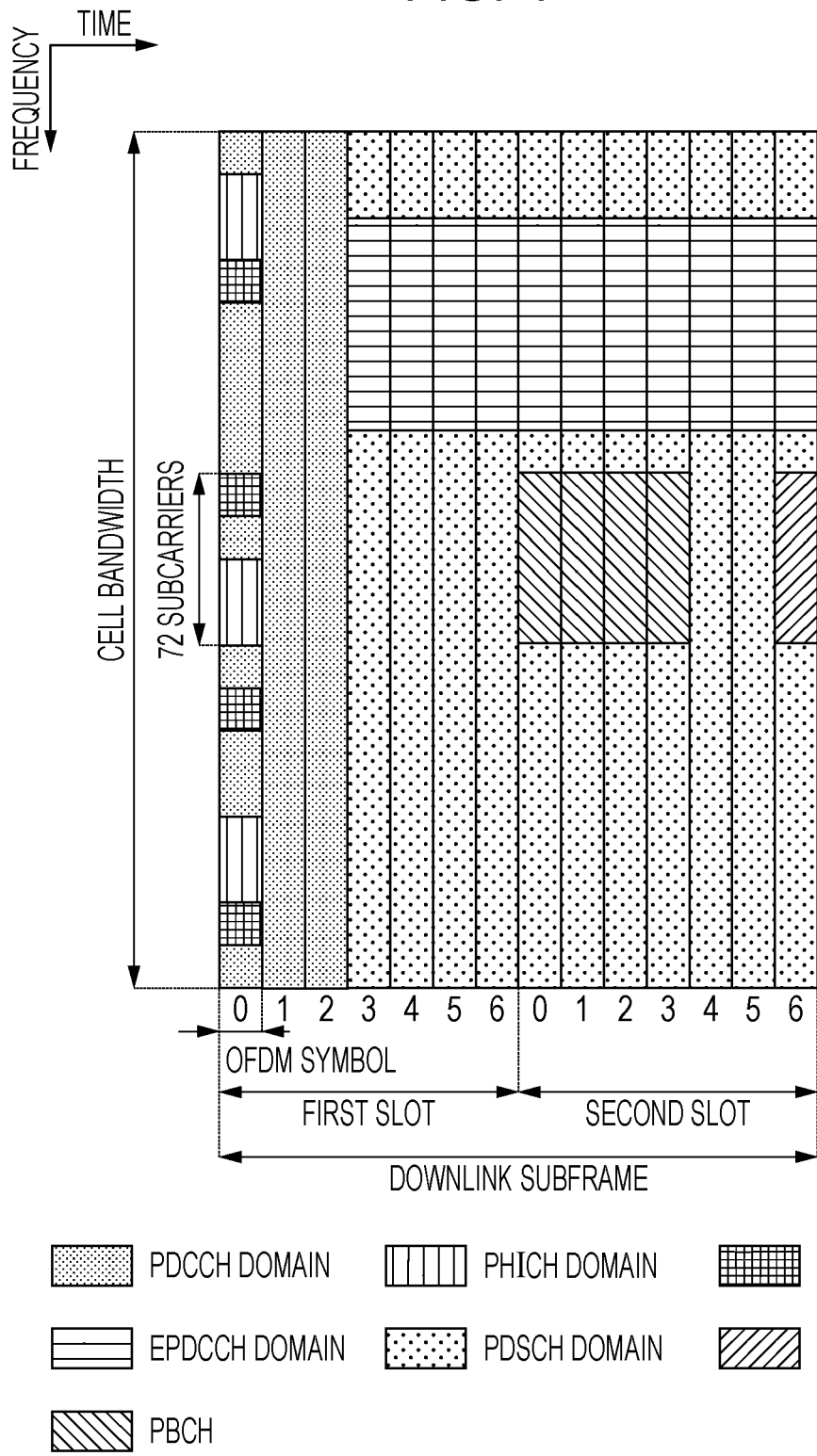
FIG. 4 is a diagram illustrating an example of a mapping between a physical channel and a physical signal in a downlink subframe.

FIG. 4 is a diagram illustrating an example of a mapping between the physical channel and the physical signal in the downlink subframe according to the present embodiment. In the downlink subframe, the base station apparatus 3 can transmit the downlink physical channel and the downlink physical signal.

For example, the PBCH is transmitted only in a subframe 0 in the radio frame. Furthermore, the downlink reference signal is mapped to the resource elements that are distributed in the frequency domain and the time domain. Here, the downlink reference signal is not illustrated in FIG. 4 for the sake of simple description.

Furthermore, multiple PDCCH's may be frequency-multiplexed or be time-multiplexed in a PDCCH domain. Furthermore, multiple EPDCCH's may be frequency-multiplexed, be time-multiplexed, and be space-multiplexed in an EPDCCH domain. Furthermore, multiple PDSCH's may be frequency-multiplexed, and be space-multiplexed in a PDSCH domain. Furthermore, the PDCCH and, the PDSCH or the EPDCCH may be time-multiplexed. Furthermore, the PDSCH and the EPDCCH may be frequency-multiplexed.

Figure 5:
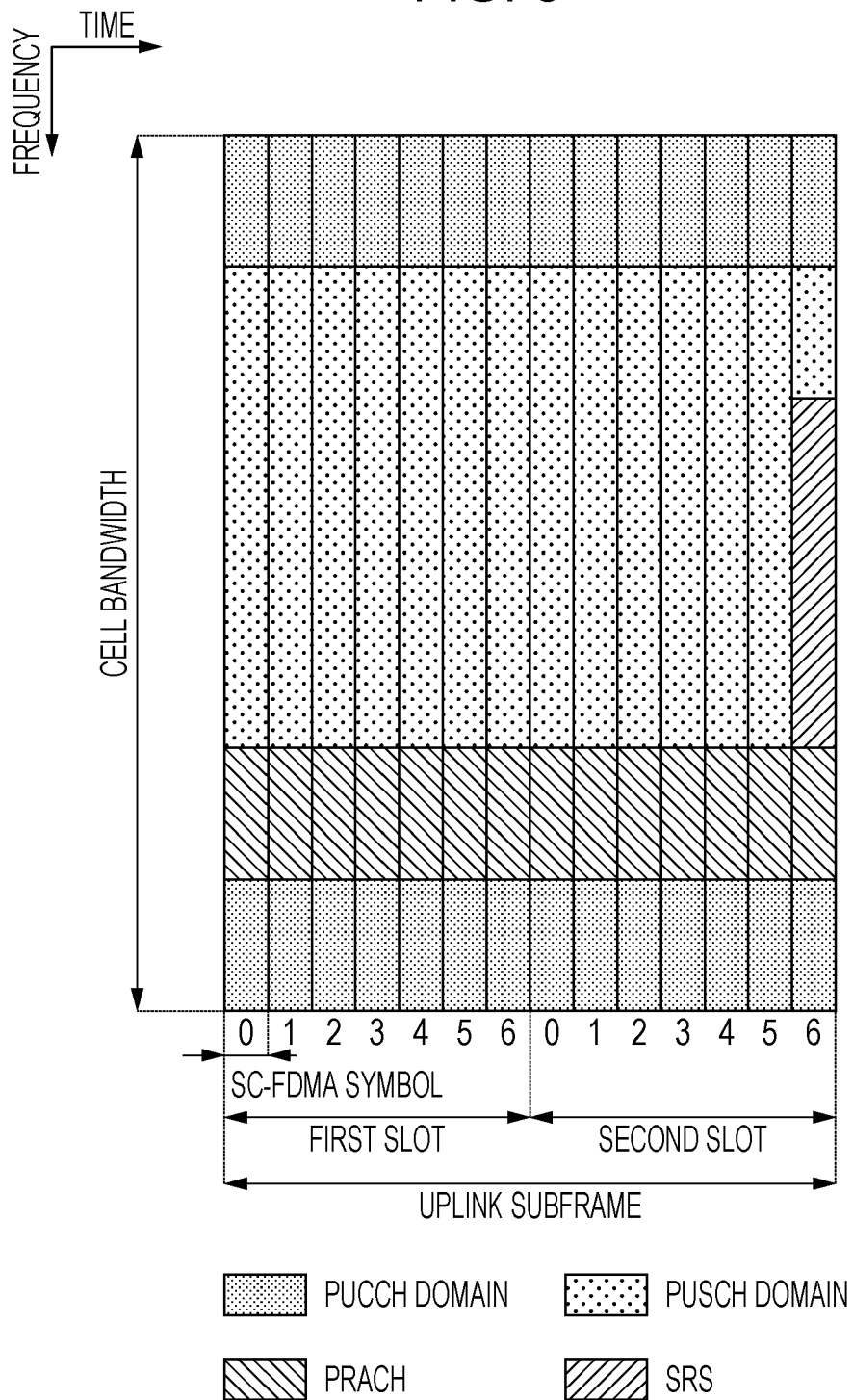
FIG. 5 is a diagram illustrating an example of a mapping between a physical channel and a physical signal in an uplink subframe.

FIG. 5 is a diagram illustrating an example of the mapping between the physical channel and the physical signal in the uplink subframe according to the present embodiment. In the uplink subframe, the terminal apparatus 1 can transmit the uplink physical channel and the uplink physical signal.

For example, in the PUCCH domain, multiple PUCCH's may be frequency-multiplexed, be time-multiplexed, and be code-multiplexed. Furthermore, in the PUSCH domain, multiple PUSCH's may be frequency-multiplexed and be space-multiplexed. Furthermore, the PUCCH and the PUSCH may be frequency-multiplexed.

Furthermore, the SRS may be transmitted using the last SC-FDMA symbol in the uplink subframe.

Figure 6:
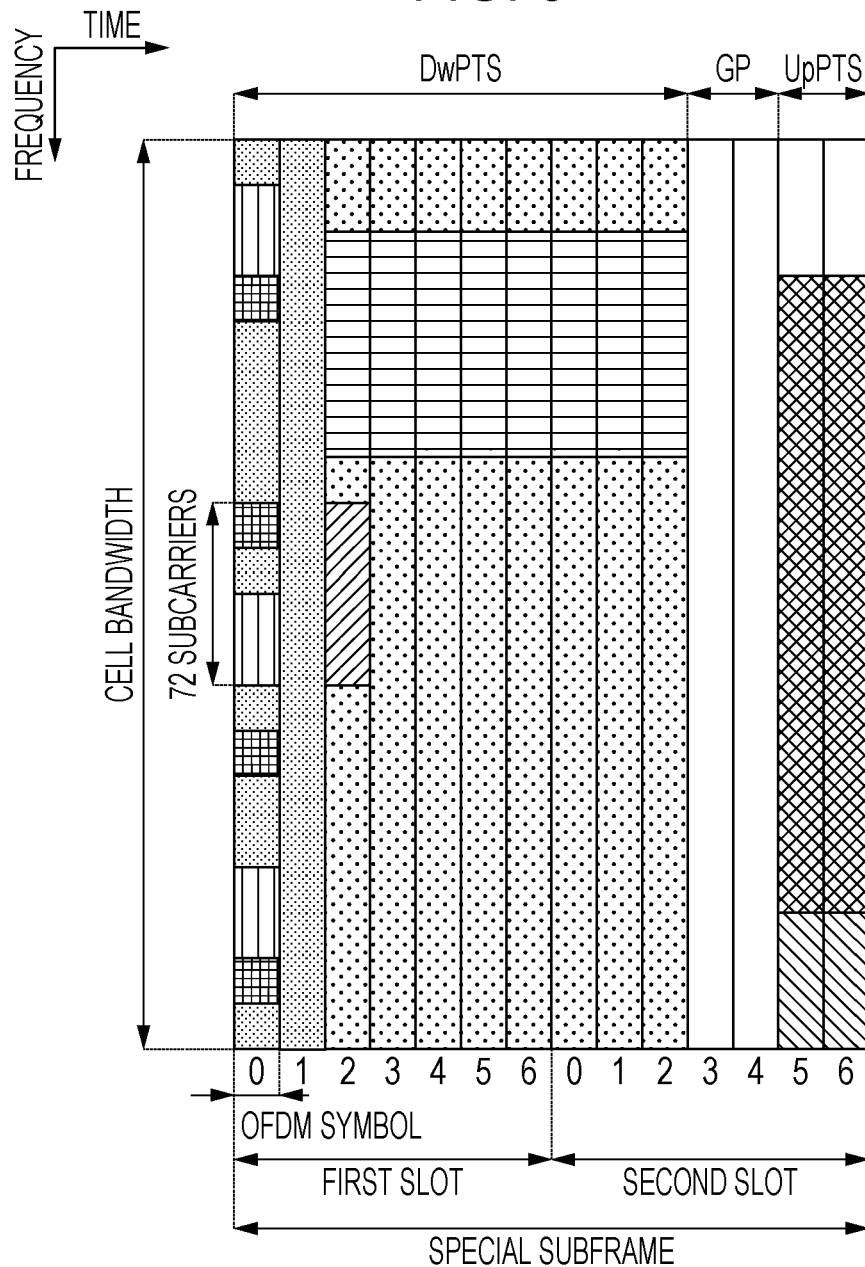
FIG. 6 is a diagram illustrating an example of a mapping between a physical channel and a physical signal in a special subframe.

FIG. 6 is a diagram illustrating an example of the mapping between the physical channel and the physical signal in the special subframe according to the present embodiment. In FIG. 6, the DwPTS is configured from the first to tenth SC-FDMA symbols in the special subframe. Furthermore, the GP is configured from the eleventh to twelfth SC-FDMA symbols in the special subframe. Furthermore, the UpPTS is configured from the thirteenth to fourteenth SC-FDMA symbols in the special subframe.

The base station apparatus 3 may transmit the PCFICH, the PHICH, the PDCCH, the EPDCCH, the PDSCH, the synchronization signal, and the downlink reference signal in the DwPTS of the special subframe. Furthermore, the base station apparatus 3 may not transmit the PBCH in the DwPTS of the special subframe.

Furthermore, the terminal apparatus 1 may transmit the SRS in the UpPTS of the special subframe. Furthermore, the terminal apparatus 1 may not transmit the PUCCH, the PUSCH, and the DMRS in the UpPTS of the special subframe.

Here, the terminal apparatus 1 monitors a set of PDCCH candidates and/or a set of EPDCCH candidates. The EPDCCH is hereinafter included in the PDCCH for the sake of simple description. Here, the PDCCH candidates refer to candidates for the PDCCH that have the likelihood of being mapped or transmitted by the base station apparatus 3. Furthermore, the monitoring means that the terminal apparatus 1 attempts to decode each of the PDCCH's within the set of PDCCH candidates, according to all the DCI formats that are monitored.

Furthermore, the set of PDCCH candidates that the terminal apparatus 1 monitors is also referred to as a search space. That is, in the PDCCH domain, a Common Search Space (CSS) and/or a user equipment-specific Search Space (USS) are configured (defined, or set). In the CSS and/or the USS, the terminal apparatus 1 monitors the PDCCH and detects the PDCCH destined for itself.

Furthermore, an RNTI that the base station apparatus 3 allocates to the terminal apparatus 1 is used in the transmission (transmission on the PDCCH) of the downlink control information. Specifically, a Cyclic Redundancy check (CRC) parity bits are attached to the DCI format (also possibly to the downlink control information) and after being attachment, the CRC parity bits are scrambled by the RNTI.

The terminal apparatus 1 attempts to decode the DCI format to which the CRC parity bits scrambled by the RNTI are attached, and detects the DCI format that succeeds in the CRC, as the DCI format destined for itself (also called blind decoding).

Here, a Cell-Radio Network Temporary Identifier (C-RNTI) is included in the RNTI. The C-RNTI is a unique identifier that is used for RRC connection and identification of the scheduling. The C-RNTI is used in unicast transmission that is dynamically scheduled.

Figure 7:
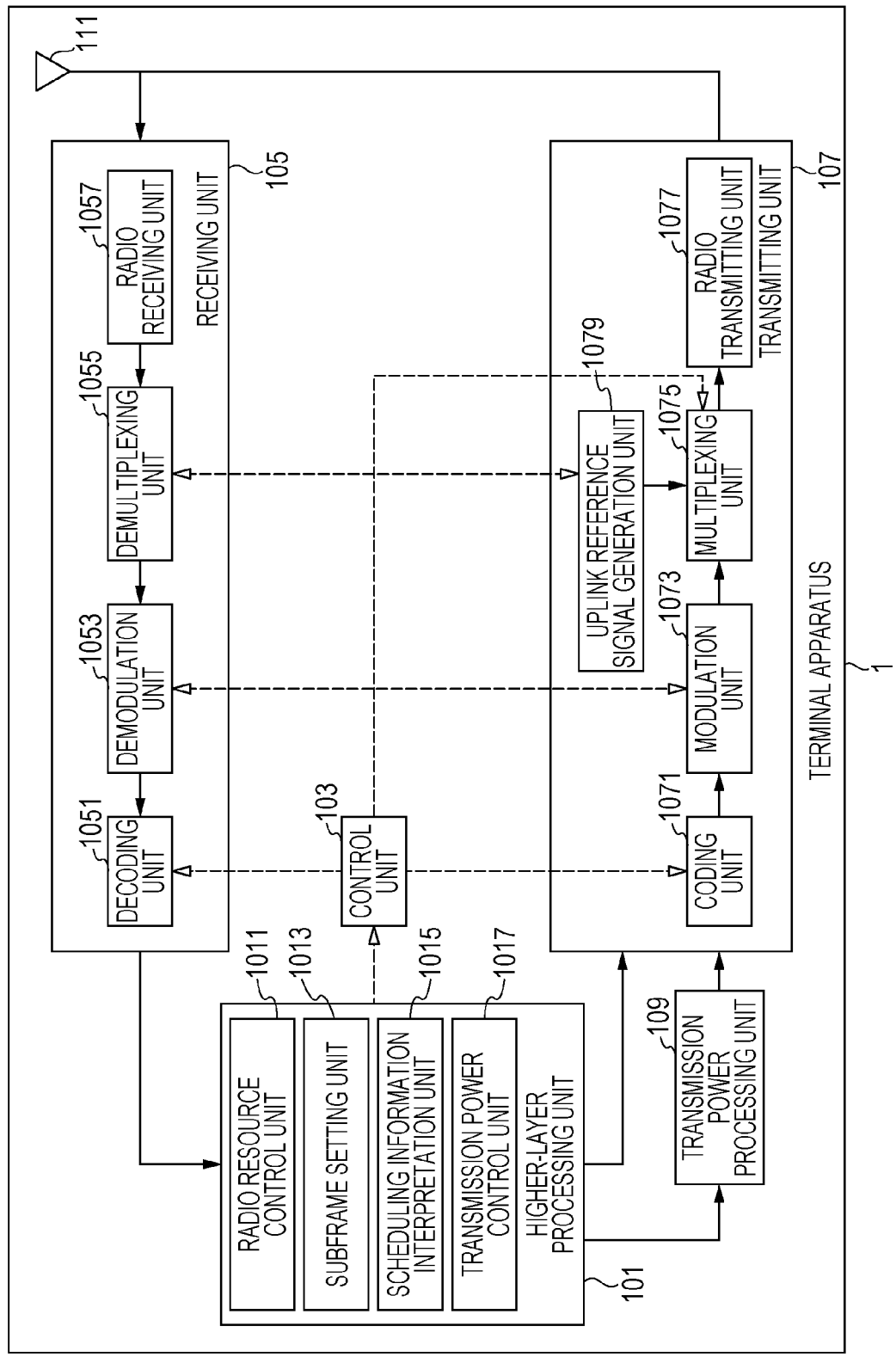
FIG. 7 is a schematic block diagram illustrating a terminal apparatus 1.

FIG. 7 is a schematic block diagram of a configuration of the terminal apparatus 1 according to the present embodiment. As illustrated in FIG. 7, the terminal apparatus 1 is configured to include a higher-layer processing unit 101, a control unit 103, a receiving unit 105, a transmitting unit 107, a transmission power processing unit 109, and a transmit and receive antenna 111. Furthermore, the higher-layer processing unit 101 is configured to include a radio resource control unit 1011, a subframe setting unit 1013, a scheduling information interpretation unit 1015, and a transmission power control unit 1017. Furthermore, the receiving unit 105 is configured to include a decoding unit 1051, a demodulation unit 1053, a demultiplexing unit 1055, and a radio receiving unit 1057. Furthermore, the transmitting unit 107 is configured to include a coding unit 1071, a modulation unit 1073, a multiplexing unit 1075, a radio transmitting unit 1077, and the uplink reference signal generation unit 1079.

The higher-layer processing unit 101 outputs to the transmitting unit 107 the uplink data (transport block) that is generated by a user operation and the like. Furthermore, the higher-layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that the higher-layer processing unit 101 includes performs management of various pieces of setting information on the terminal apparatus 1 itself. Furthermore, the radio resource control unit 1011 generates information that is arranged on each uplink channel and outputs the generated information to the transmitting unit 107.

The subframe setting unit 1013 performs management of a first configuration, a second configuration, and a third configuration. The subframe setting unit 1013 sets the first configuration, the second configuration, and the third configuration. Furthermore, the subframe setting unit 1013 sets at least two subframes.

The scheduling information interpretation unit 1015 that the higher-layer processing unit 101 includes interprets the DCI format (scheduling information) that is received by the receiving unit 105, generates control information for performing control of the receiving unit 105 and the transmitting unit 107 based on a result of interpreting the DCI format, and outputs the generated control information to the control unit 103.

The scheduling information interpretation unit 1015 further determines a timing at which transmitting processing and receiving processing are performed, based on the first configuration, the second configuration, and the third configuration.

The transmission power control unit 1017 executes control for processing associated with transmission power. The transmission power control unit 1017 outputs a setting that is used to execute transmission power control, to the transmission power processing unit 109. Furthermore, the transmission power control unit 1017 instructs the transmitting unit 107 to transmit the uplink signal based on the transmission power control. The transmission power control unit 1017 outputs a setting that is used to execute power headroom reporting, to the transmission power processing unit 109. Furthermore, the transmission power control unit 1017 instructs the transmitting unit 107 to report the power headroom.

The control unit 103 generates a control signal for performing control of the receiving unit 105, the transmitting unit 107 and the transmission power processing unit 109, based on the control information from the higher-layer processing unit 101. The control unit 103 outputs the generated control signal to the receiving unit 105, the transmitting unit 107, and the transmission power processing unit 109 and performs the control of the receiving unit 105 and the transmitting unit 107.

In accordance with the control signal that is input from the control unit 103, the receiving unit 105 demultiplexes, demodulates, and decodes a received signal that is received from the base station apparatus 3 through the transmit and receive antenna 111, and outputs the resulting information to the higher-layer processing unit 101.

The radio receiving unit 1057 converts (down converts) a downlink signal received through the transmit and receive antenna 111 into a baseband signal by performing orthogonal demodulation, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

Furthermore, the radio receiving unit 1057 removes a portion equivalent to a guide interval (GI) from the digital signal that results from the conversion, performs fast Fourier Transform (FFT) on the signal from which the guide interval is removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 performs channel correction on the PHICH, the PDCCH, the EPDCCH, and the PDSCH, based on an estimated value for the channel that is acquired as a result of measuring the channel.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH destined for the terminal apparatus 1 itself, and outputs to the higher-layer processing unit 101 the HARQ indicator that results from the decoding.

Furthermore, the demodulation unit 1053 performs demodulation in compliance with a modulation scheme such as QPSK on the PDCCH and/or the EPDCCH and outputs a result of the demodulation to the decoding unit 1051. The decoding unit 1051 attempts to perform the decoding of the PDCCH and/or the EPDCCH. In a case where the decoding unit 1051 succeeds, the decoding unit 1051 outputs to the higher-layer processing unit 101 the downlink control information that results from the decoding and the RNTI that the downlink control information corresponds to.

Furthermore, demodulation unit 1053 performs the demodulation on the PDSCH in compliance with the modulation scheme notified with the downlink assignment, such as Quadrature Phase Shift Keying (QPSK), 16 Quadrature Amplitude Modulation (QAM), or 64 QAM, and outputs a result of the demodulation to the decoding unit 1051. The decoding unit 1051 performs the decoding based on information relating to a coding rate that is notified with the downlink control information, and outputs to the higher-layer processing unit 101 the downlink data (transport block) that results from the decoding.

The transmitting unit 107 generates the uplink reference signal in accordance with the control signal that is input from the control unit 103, performs the coding and the modulation on the uplink data (transport block) that is input from the higher-layer processing unit 101, multiplexes the PUCCH, the PUSCH, the generated uplink reference signal, and transmits a result of the multiplexing to the base station apparatus 3 through the transmit and receive antenna 111.

The coding unit 1071 performs the coding, such as convolutional coding and block coding, on the uplink control information that is input from the higher-layer processing unit 101. Furthermore, the coding unit 1071 performs turbo coding, based on information that is used in the scheduling of the PUSCH.

The modulation unit 1073 performs the modulation on coded bits that are input from the coding unit 1071, in compliance with the modulation scheme notified with the downlink control information, such as BPSK, QPSK, 16 QAM, or 64 QAM, or the modulation scheme that is prescribed in advance on every channel.

The uplink reference signal generation unit 1079 generates a sequence that is acquired according to a rule (formula) prescribed in advance, based on a physical cell identity (PCI) (also referred to as a Cell ID) for identifying the base station apparatus 3, a bandwidth over which the uplink reference signal is arranged, a cyclic shift that is notified with the uplink grant, a parameter value for generation of a DMRS sequence, and the like.

In accordance with the control signal that is input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for every transmit antenna port. To sum up, the multiplexing unit 1075 arranges the PUCCH and PUSCH signals and the generated uplink reference signal in the resource element for every transmit antenna port.

The radio transmitting unit 1077 performs Inverse Fast Fourier Transform (IFFT) on the multiplexed signal, performs the modulation in compliance with an SC-FDMA scheme, generates an SC-FDMA symbol, appends a CP to the generated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (performs upconversion (up convert) on) the signal in the intermediate frequency into a high-frequency signal, removes unnecessary frequency components, and performs power amplification, and outputs a final result to the transmit and receive antenna 111 for transmission.

The transmission power processing unit 109 performs processing associated with the transmission power. The transmission power processing unit 109 executes the transmission power control based on a setting and the like that are input from the higher-layer processing unit 101. Furthermore, the transmission power processing unit 109 computes a value of the power headroom based on the setting and the like that are input from the higher-layer processing unit 101.

Figure 8:
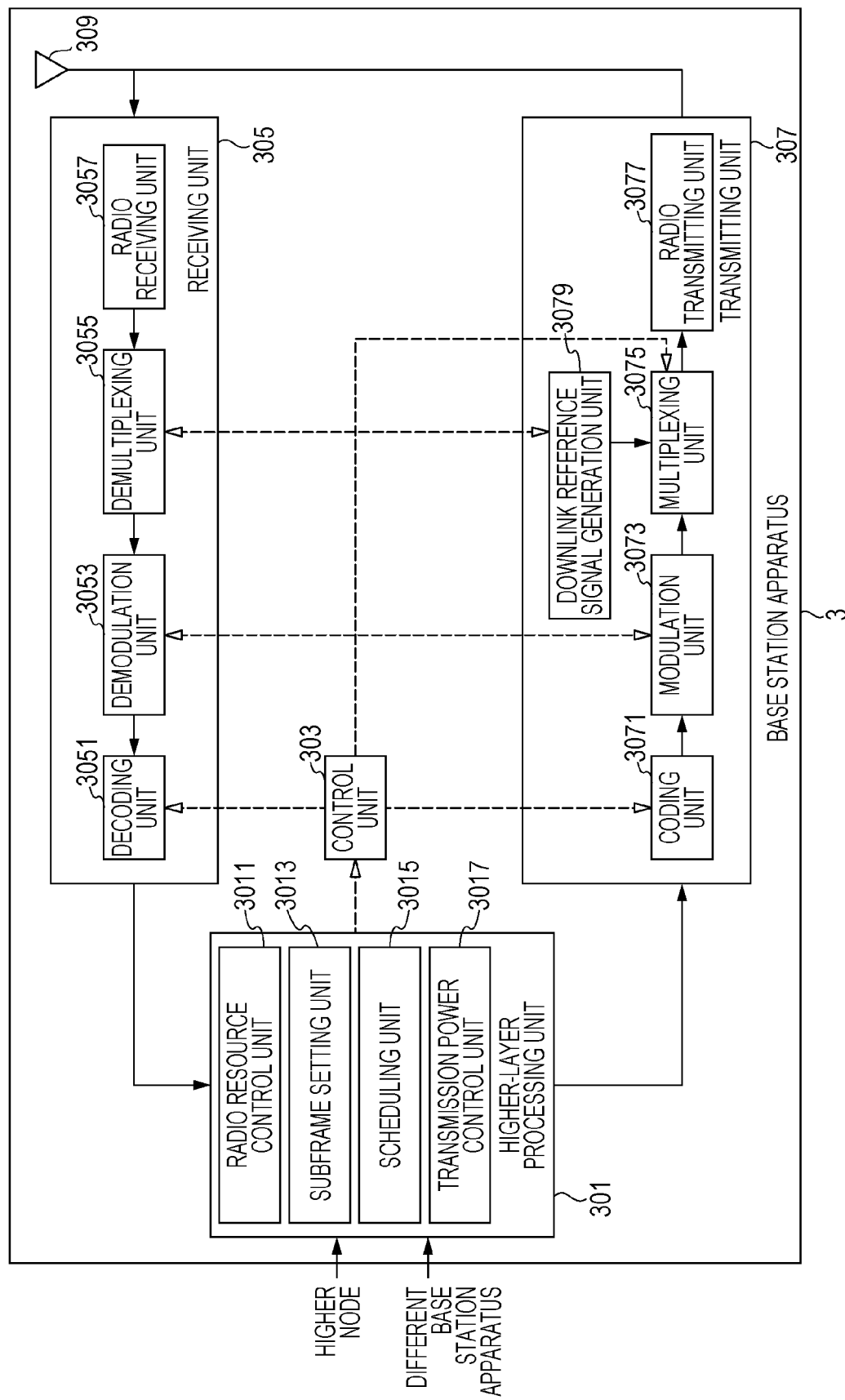
FIG. 8 is a schematic block diagram illustrating a base station apparatus 3.

FIG. 8 is a schematic block diagram illustrating a configuration of the base station apparatus 3 according to the present embodiment. As illustrated in FIG. 8, the base station apparatus 3 is configured to include a higher-layer processing unit 301, a control unit 303, a receiving unit 305, a transmitting unit 307, and a transmit and receive antenna 309. Furthermore, the higher-layer processing unit 301 is configured to include a radio resource control unit 3011, a subframe setting unit 3013, a scheduling unit 3015, and a transmission power control unit 3017. Furthermore, the receiving unit 305 is configured to include a decoding unit 3051, a demodulation unit 3053, a demultiplexing unit 3055, and a radio receiving unit 3057. Furthermore, the transmitting unit 307 is configured to include a coding unit 3071, a modulation unit 3073, a multiplexing unit 3075, a radio transmitting unit 3077, and a downlink reference signal generation unit 3079.

Furthermore, the higher-layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher-layer processing unit 301 generates a control signal for performing control of the receiving unit 305, and the transmitting unit 307, and outputs the control information to the control unit 303.

The radio resource control unit 3011 that the higher-layer processing unit 301 includes generates, or acquires from a higher-level node, the downlink data (transport block) that is arranged in the downlink PDSCH, system information, the RRC message, the MAC CE, and the like, and outputs a result of the generation or of the acquirement to the transmitting unit 307. Furthermore, the radio resource control unit 3011 manages management of various pieces of setting information on each of the terminal apparatus 1.

The subframe setting unit 3013 performs management of a first configuration, a second configuration, and a third configuration on each of the terminal apparatus 1. The subframe setting unit 3013 performs setting of the first configuration, the second configuration, and the third configuration on each of the terminal apparatus 1.

Furthermore, the subframe setting unit 3013 generates first information indicating the first configuration, second information indicating the second configuration, and third information indicating the third configuration. The subframe setting unit 3013 outputs the first information, the second information, and the third information to the terminal apparatus 1 through the transmitting unit 307.

The base station apparatus 3 may determine the first configuration, the second configuration, and/or the third configuration for the terminal apparatus 1. Furthermore, the first configuration, the second configuration, and/or third configuration for the terminal apparatus 1 may be given to the base station apparatus 3 by the higher-level node.

For example, the subframe setting unit 3013 may determine the first configuration, the second configuration, and/or the third configuration, based on an amount of uplink traffic and an amount of downlink traffic.

The subframe setting unit 3013 performs management of at least two subframe sets. The subframe setting unit 3013 may perform setting of at least two subframe sets on each of the terminal apparatus 1. The subframe setting unit 3013 may perform the setting of at least two subframe sets on each of the cells. The subframe setting unit 3013 may perform the setting of at least two subframe sets for each CSI process.

The subframe setting unit 3013 transmits information indicating at least two subframe sets to the terminal apparatus 1 through the transmitting unit 307.

The scheduling unit 3015 that the higher-layer processing unit 301 includes determines a frequency and a subframe in which the physical channel (the PDSCH and the PUSCH) is allocated, the coding rate and the modulation scheme of the physical channel (the PDSCH and the PUSCH), the transmission power, and the like. The scheduling unit 3015 generates the control information (for example, the DCI format) in order to perform control of the receiving unit 305 and the transmitting unit 307 based on a result of the scheduling, and outputs the generated information to the control unit 303.

The scheduling unit 3015 generates the information that is used in the scheduling of the physical channel (the PDSCH and the PUSCH), based on the result of the scheduling. The scheduling unit 3015 may determine the timing at which the transmitting processing and receiving processing are performed, based on the first configuration, the second configuration, and/or the third configuration.

The transmission power control unit 3017 that the higher-layer processing unit 301 includes controls processing associated with the transmission power, which is executed by the terminal apparatus 1. The transmission power control unit 3017 transmits information that is used in order for the terminal apparatus 1 to execute the transmission power control, to the terminal apparatus 1 through the transmitting unit 307. The transmission power control unit 3017 transmits information that is used in order for the terminal apparatus 1 to report the power headroom, to the terminal apparatus 1 through the transmitting unit 307.

The control unit 303 generates the control signal for performing control of the receiving unit 305 and the transmitting unit 307, based on the control information from the higher-layer processing unit 301. The control unit 303 outputs the generated control signal to the receiving unit 305 and the transmitting unit 307, and performs control of the receiving unit 305 and the transmitting unit 307.

In accordance with the control signal that is input from the control unit 303, the receiving unit 305 demultiplexes, demodulates, and decodes a received signal that is received from the terminal apparatus 1 through the transmit and receive antenna 309, and outputs the resulting information to the higher-layer processing unit 301. The radio receiving unit 3057 converts an uplink signal received through the transmit and receive antenna 309 into a baseband signal by performing the down conversion, removes unnecessary frequency components, controls an amplification level in such a manner as to suitably maintain a signal level, performs the orthogonal demodulation based on an in-phase component and an orthogonal component of the received signal, and converts the resulting orthogonally-demodulated analog signal into a digital signal.

The radio receiving unit 3057 removes a portion corresponding to the guide interval (GI) from the digital signal that results from the conversion. The radio receiving unit 3057 performs the Fast Fourier Transform (FFT) on the signal from which the guide interval is removed, and outputs the resulting signal to the demultiplexing unit 3055 that extracts the signal in the frequency domain.

The demultiplexing unit 1055 demultiplexes the signal that is input from the radio receiving unit 3057 into the PUCCH, the PUSCH, and the signal such as the uplink reference signal. Moreover, the demultiplexing is performed based on radio resource allocation information that is determined in advance in the radio resource control unit 3011 by the base station apparatus 3, and that is included in the uplink grant notified to each terminal apparatus 1. Furthermore, the demultiplexing unit 3055 performs correction of the channels of the PUCCH and the PUSCH. Furthermore, the demultiplexing unit 3055 demultiplexes the uplink reference signal.

A demodulation unit 3053 performs Inverse Discrete Fourier Transform (IDFT) on the PUSCH, acquires the modulation symbol, and performs the demodulation of the received signal with respect to each of the modulation symbols of the PUCCH and the PUSCH, using the modulation scheme prescribed in advance, such as the Binary Phase Shift Keying (BPSK), QPSK, 16 QAM, or 64 QAM, or the modulation scheme that the base station apparatus 3 itself notifies, in advance with the uplink grant, to each of the user terminal 1.

The decoding unit 3051 performs the decoding on the demodulated coded bits of the PUCCH and the PUSCH at the coding rate in compliance with a coding scheme prescribed in advance, which is prescribed in advance, or is notified in advance with the uplink grant to the terminal apparatus 1 by the base station apparatus 3 itself, and outputs to the higher-layer processing unit 101 the uplink data and the uplink control information that are decoded. In a case where the PUSCH is retransmitted, the decoding unit 3051 performs the decoding using the coded bits that are input from the higher-layer processing unit 301 and that are retained in a HARQ buffer and the demodulated coded bits.

The channel measurement unit 309 measures an estimated value for the channel or channel quality, and the like, based on the uplink reference signal that is input from the demultiplexing unit 3055, and outputs a result of the measurement to the demultiplexing unit 3055 and the higher-layer processing unit 301.

The transmitting unit 307 generates the downlink reference signal in accordance with the control signal that is input from the control unit 303, codes and modulates the HARQ indicator, the downlink control information, and the downlink data that are input from the higher-layer processing unit 301, multiplexes the PHICH, the PDCCH, the EPDCCH, the PDSCH, and the downlink reference signal, and transmits a result of the multiplexing to the terminal apparatus 1 through the transmit and receive antenna 309.

The coding unit 3071 performs the coding on the HARQ indicator, the downlink control information, and the downlink data that are input from the higher-layer processing unit 301. When performing the coding, the coding unit 3071 uses the coding scheme that is prescribed in advance, such as block coding, convolutional coding, or turbo coding, or the coding scheme that is determined by the radio resource control unit 3011. The modulation unit 3073 performs the modulation on the coded bits that are input from the coding unit 3071. When performing the modulation, the modulation unit 3073 uses the modulation scheme that is in advance prescribed, such as BPSK, QPSK, 16 QAM, or 64 QAM, or the modulation scheme that is determined by the radio resource control unit 3011.

The downlink reference signal generation unit 3079 generates as the downlink reference signal a sequence that is already known to the terminal apparatus 1, which is acquired according to a rule that is prescribed in advance based on the physical cell identity (PCI) for identifying the base station apparatus 3, and the like. The multiplexing unit 3075 multiplexes the modulated modulation symbol of each channel and the generated downlink reference signal. To sum up, the multiplexing unit 3075 arranges the modulated modulation symbol of each channel and the generated downlink reference signal in the resource elements.

The radio transmitting unit 3077 performs Inverse Fast Fourier Transform (IFFT) on the multiplexed modulation symbol and the like, performs the modulation in compliance with an OFDM scheme, appends the guide interval to the OFDM-modulated OFDM symbol, generates a digital signal in the baseband, converts the digital signal in the baseband into an analog signal, generates an in-phase component and an orthogonal component in the intermediate frequency from the analog signal, removes unnecessary frequency components using a low pass filter, performs up conversion to a carrier frequency, amplifies power, and transmit a final result to the transmit and receive antenna 309.

The first configuration, the second configuration, and the third configuration will be described in detail.

The first configuration is also referred to as an uplink reference uplink-downlink configuration. Furthermore, the first configuration is also referred to a serving cell uplink-downlink configuration. Furthermore, the first configuration is also referred to as an uplink reference configuration. Furthermore, the first configuration may be referred to as a first parameter.

Furthermore, the second configuration is also referred to as a downlink reference uplink-downlink configuration. Furthermore, the second configuration is also referred to as a downlink reference configuration. Furthermore, the second configuration may be referred to as a second parameter.

Furthermore, the third configuration is also referred to as a transmission direction uplink-downlink configuration. Furthermore, the third configuration may be referred to as a third parameter.

For example, the first configuration, the second configuration, and the third configuration may be defined based on an uplink-downlink configuration. Here, the uplink-downlink configuration is a configuration associated with a subframe pattern within the radio frame. That is, the uplink-downlink configuration indicates which subframe within the radio frame is a downlink subframe, an uplink subframe, or a special subframe.

That is, the first configuration, the second configuration, and the third configuration may be defined by patterns of the downlink subframe, the uplink subframe, and the special subframe within the radio frame.

Here, patterns of the downlink subframe, the uplink subframe, and the special subframe indicate which one of the subframes #0 to #9 is a downlink subframe, an uplink subframe, and a special subframe. Preferably, D, U, and S (which indicate the downlink subframe, the uplink subframe, and the special subframe, respectively) should be collectively expressed as an arbitrary combination of D, U, and S, which is 10 in length. Furthermore, more preferably, the leading subframe (that is, a subframe #0) should be D, and the second subframe (that is, a subframe #1) should be S.

FIG. 9 is a table illustrating an example of the uplink-downlink configuration, according to the present embodiment. In FIG. 9, D indicates a downlink subframe. Furthermore, U indicates an uplink subframe. Furthermore, S indicates a special subframe.

Here, when the uplink-downlink configuration i is set as the first configuration, the first configuration i is said to be set. Furthermore, when the uplink-downlink configuration i is set as the second configuration, the second configuration i is said to be set. Furthermore, when the uplink-downlink configuration i is set as the third configuration, the third configuration i is said to be set.

The base station apparatus 3 sets the first configuration, the second configuration, and the third configuration. Furthermore, the base station apparatus 3 may transmit the first information indicating the first configuration to the terminal apparatus 1. Furthermore, the base station apparatus 3 may transmit the second information indicating the second configuration to the terminal apparatus 1. Furthermore, the base station apparatus 3 may transmit the third information indicating the third configuration to the terminal apparatus 1.

For example, the base station apparatus 3 may transmit the first information in a state where the first information is included in at least one among the master information block, the system information block type-1 message, the system information message, the RRC message, the MAC CE, and the control information (for example, the DCI format) in the physical layer.

Furthermore, the base station apparatus 3 may transmit the second information in a state where the second information is included in at least one among the master information block, the system information block type-1 message, the system information message, the RRC message, the MAC CE, and the control information (for example, the DCI format) in the physical layer.

Furthermore, the base station apparatus 3 may transmit the third information in a state where the third information is included in at least one among the master information block, the system information block type-1 message, the system information message, the RRC message, the MAC CE, and the control information (for example, the DCI format) in the physical layer.

For example, the base station apparatus 3 may transmit the first information for the primary cell, the second information for the primary cell, the third information for the primary cell, the first information for the secondary cell, the second information for the secondary cell, the third information for the secondary cell, to the terminal apparatus 1 that two cells, configured from one primary cell and one secondary cell, are set to serve.

Figure 10:
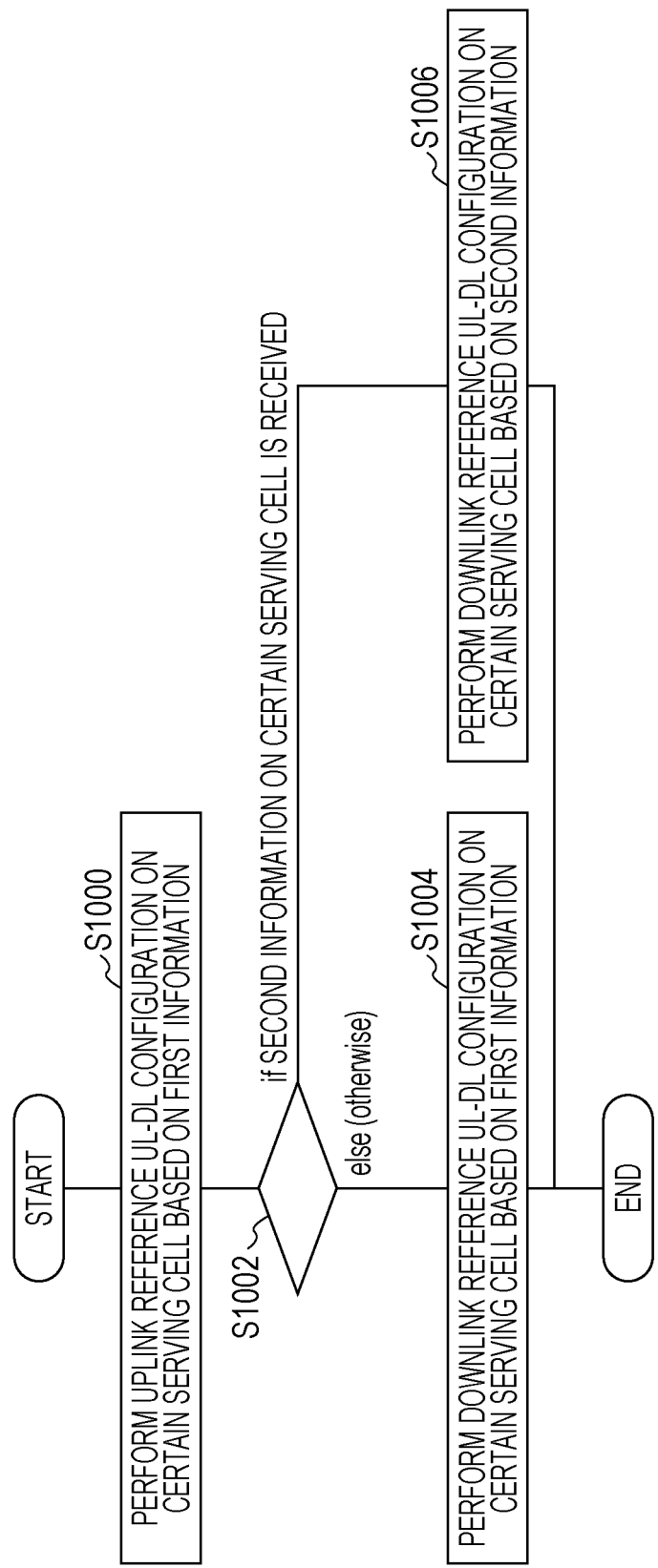
FIG. 10 is a flowchart illustrating a method of setting a first configuration and a second configuration.

FIG. 10 is a flowchart illustrating a method of setting the first configuration and the second configuration according to the present embodiment. The terminal apparatus 1 sets the first configuration to be applied to a certain cell, based on the first information (S1000). Furthermore, the terminal apparatus 1 determines whether the second information for the certain cell is received (S1002). Furthermore, in a case where the second information for the certain cell is received, the terminal apparatus 1 sets the second configuration to be applied to the certain cell, based on the second information for the certain cell (S1006).

In a case where the second information for the certain cell is not received (else/otherwise), the terminal apparatus 1 sets the second configuration to be applied to the certain cell, based on the first information for the certain cell (S1004). Here, the second configuration that is set based on the first information may be referred to as the serving cell uplink-downlink configuration.

The terminal apparatus 1 receives the second information and, based on the second information, determines the subframe that is available for the transmission of the uplink signal. Furthermore, the terminal apparatus 1 monitors the third information. Furthermore, in a case where the third information is received, the terminal apparatus 1 determines the subframe that is available for the transmission of the uplink signal, based on the third information.

The first configuration will be described. The first configuration is at least used in a certain cell, in order to specify ("specify" hereinafter includes at least the meanings of "select", "determine", and "indicate") the subframe that is, or is not, available for the uplink transmission.

The terminal apparatus 1 does not perform the transmission for the uplink in the subframe that is indicated by the first configuration as the downlink subframe. Furthermore, the terminal apparatus 1 does not perform the transmission for the uplink in the DwPTS and the GP of the subframe that is indicated by the first configuration as the special subframe.

The second configuration will be described. The second configuration is at least used in a certain cell in order to specify the subframe that is, or not, available for the downlink transmission.

The terminal apparatus 1 does not perform the downlink transmission in the subframe that is indicated by the second configuration as the uplink subframe. Furthermore, the terminal apparatus 1 does not perform the downlink transmission in the UpPTS and the GP of the subframe that is indicated by the second configuration as the special subframe.

Here, the terminal apparatus 1 that sets the second configuration based on the first information may perform a measurement (for example, a measurement associated with the channel state information) that uses the downlink signal in the DwPTS of the downlink subframe or the special subframe that is indicated by the first configuration or the second configuration.

Furthermore, the terminal apparatus 1 that sets the second configuration based on the second information may perform the measurement that uses the downlink signal in the DwPTS of the downlink subframe or the special subframe that is indicated by the first configuration.

FIG. 11 is a diagram illustrating a relationship between the subframe that is indicated by the first configuration and the subframe that is indicated by the second configuration according to the present embodiment. In FIG. 11, D indicates the downlink subframe, U indicates the uplink subframe, and S indicates the special subframe.

The base station apparatus 3 may specify the second configuration among a configuration set (configuration of a set) that is limited based on the first configuration. That is, the second configuration may be an element in the configuration set that is limited based on the first configuration. For example, the configuration set that is limited based on the first configuration may include the UL-DL configuration that satisfies conditions (a) to (c) illustrated in FIG. 11.

Here, the subframe that is indicated as the uplink subframe by the first configuration and is indicated as the uplink subframe by the second configuration is also referred to as a fixed uplink subframe.

Here, the subframe that is indicated as the downlink subframe by the first configuration and is indicated as the downlink subframe by the second configuration is also referred to as a fixed downlink subframe.

Furthermore, the subframe that is indicated as the special subframe by the first configuration and is indicated as the special subframe by the second configuration is also referred to as a fixed special subframe.

Furthermore, the subframe that is indicated as the uplink subframe by the first configuration and is indicated as the downlink subframe by the second configuration is also referred to as a first flexible subframe. The first flexible subframe is a subframe that is reserved for the transmission for the uplink and the downlink.

Furthermore, the subframe that is indicated as the special subframe by the first configuration and is indicated as the downlink subframe by the second configuration is also referred to as a second flexible subframe. The second flexible subframe is reserved for the downlink transmission. Furthermore, the second flexible subframe is a subframe that is reserved for the downlink transmission in the DwPTS and is reserved for the transmission for the uplink in the UpPTS.

The first flexible subframe and the second flexible subframe are hereinafter collectively referred to as a flexible subframe.

The third configuration will be described. The base station apparatus 3 and the terminal apparatus 1 set the third configuration associated with transmission direction (uplink/downlink) in the subframe. That is, the third configuration may be used to determine the transmission direction in the subframe. For example, the terminal apparatus 1 may control the transmission in the flexible subframe, based on the scheduling information (the DCI format and/or the HARQ-ACK) and the third configuration.

That is, the third information that indicates the third configuration may be used to indicate the subframe that is available for the uplink transmission. Furthermore, the third information may be used to indicate the subframe that is available for the downlink transmission. Furthermore, the third information may be used to indicate the subframe that is available for the uplink transmission in the UpPTS and for the downlink transmission in the DwPTS.

Furthermore, the third configuration may be used to specify the transmission direction in the subframe that is indicated by the first configuration as the uplink subframe and is indicated by the second configuration as the downlink subframe. Furthermore, the third configuration may be used to specify the transmission direction in the subframe that is indicated by the first configuration as the special subframe and is indicated by the second configuration as the downlink subframe.

That is, the third configuration is used to specify the transmission direction in the subframes that are indicated by the first configuration and the second configuration as the subframes that are different in transmission direction.

Here, the base station apparatus 3 may perform the scheduling of the downlink transmission in the subframe that is indicated by the third configuration as the downlink subframe.

Furthermore, the terminal apparatus 1 may perform the receiving processing of the downlink signal in the subframe that is indicated by the third configuration as the downlink subframe. Furthermore, the terminal apparatus 1 may perform the monitoring of the PDCCH/EPDCCH in the subframe that is indicated by the third configuration as the downlink subframe.

Furthermore, the terminal apparatus 1 may perform receiving processing of the PDSCH in the subframe that is indicated by the third configuration as the downlink subframe, based on detection of the downlink assignment transmitted on the PDCCH/EPDCCH.

Furthermore, in a case where the transmission of the uplink signal (PUSCH/SRS) in the subframe that is indicated by the third configuration as the downlink subframe is scheduled or set, the terminal apparatus 1 does not perform the transmitting processing of the uplink signal (PUSCH/SRS) in the subframe.

Furthermore, the base station apparatus 3 may perform the scheduling of the uplink transmission in the subframe that is indicated by the third configuration as the uplink subframe.

Furthermore, the base station apparatus 3 may perform the scheduling of the downlink transmission in the subframe that is indicated by the third configuration as the uplink subframe. Here, the scheduling of the downlink transmission by the base station apparatus 3 may be prohibited in the subframe that is indicated by the third configuration as the uplink subframe.

The terminal apparatus 1 may perform the transmitting processing of the uplink signal in the subframe that is indicated by the third configuration as the uplink subframe. Furthermore, in a case where the transmission of the uplink signal (PUSCH/DMRS/SRS) in the subframe that is indicated by the third configuration as the uplink subframe is scheduled or set, the terminal apparatus 1 may perform the transmitting processing of the uplink signal (PUSCH/DMRS/SRS) in the subframe.

Furthermore, the terminal apparatus 1 may perform the receiving processing of the downlink signal in the subframe that is indicated by the third configuration as the uplink subframe, and in which the uplink transmission is not scheduled. Here, the receiving processing of the downlink signal by the terminal apparatus 1 may be prohibited in the subframe that is indicated by the third configuration as the uplink subframe.

Furthermore, the base station apparatus 3 may perform the scheduling of the downlink transmission in the DwPTS of the subframe that is indicated by the third configuration as the special subframe.

The terminal apparatus 1 may perform the receiving processing of the downlink signal in the DwPTS of the subframe that is indicated by the third configuration as the special subframe. Furthermore, the terminal apparatus 1 may perform the monitoring of the PDCCH/EPDCCH in the DwPTS of the subframe that is indicated by the third configuration as the special subframe.

Furthermore, the terminal apparatus 1 may perform the receiving processing of the PDSCH in the DwPTS of the subframe that is indicated by the third configuration as the special subframe, based on the detection of the downlink assignment that is transmitted on the PDCCH/EPDCCH.

Furthermore, in a case where the transmission of the PUSCH in the subframe that is indicated by the third configuration as the special subframe is scheduled or set, the terminal apparatus 1 does not perform the transmitting processing of the PUSCH in the subframe.

Furthermore, in a case where the transmission of the SRS in the UpPTS of the subframe that is indicated by the third configuration as the special subframe is scheduled or set, the terminal apparatus 1 may perform the transmitting processing of the SRS in the UpPTS of the subframe.

HARQ timing for the uplink will be described. For example, the first configuration may be used to specify a correspondence between a subframe n in which the PDCCH/EPDCCH/PHICH is allocated and a subframe n+k in which the PUSCH that the PDCCH/EPDCCH/PHICH corresponds to is allocated.

FIG. 12 is a diagram illustrating an example of the correspondence between the subframe n in which the PDCCH/EPDCCH/PHICH is allocated and the subframe n+k in which the PUSCH that the PDCCH/EPDCCH/PHICH corresponds to is allocated, according to the present embodiment. When descriptions are provided below referring to FIG. 12, the first configuration is also simply referred to as the UL-DL configuration.

The terminal apparatus 1 specifies a value of k, based on a table illustrated in FIG. 12. Here, the subframe n and the subframe n+k are subframes that are intended for the terminal apparatus 1 (at the terminal apparatus 1 side).

In a case where, in the subframe n, the PDCCH/EPDCCH that corresponds to a cell where UL-DL configurations 1 to 6 are set to be applied, and that involves the uplink grant destined for the terminal apparatus 1, is detected, the terminal apparatus 1 performs the transmission on the PUSCH that corresponds to the uplink grant, in the subframe n+k that is specified based on the table in FIG. 12.

Here, the transmission on the PUSCH that corresponds to the uplink grant includes the meaning of the transmission on the PUSCH that is scheduled using the uplink grant. Furthermore, the performing of the transmission includes the meaning of adjusting of the transmission on the PUSCH.

Furthermore, in a case where, in the subframe n, the PHICH that corresponds to the cell where the UL-DL configurations 1 to 6 are set to be applied, and that involves the NACK destined for the terminal apparatus 1, is detected, the terminal apparatus 1 performs the transmission on the PUSCH that corresponds to the PHICH, in the subframe n+k that is specified based on the table in FIG. 13.

Here, a two-bit uplink index (UL index) is included in the uplink grant destined for the terminal apparatus 1, which corresponds to a cell where the UL-DL configuration 0 is set to be applied. An uplink index (UL index) is not included in the uplink grant destined for the terminal apparatus 1, which corresponds to a cell where the UL-DL configurations 1 to 6 are set to be applied.

Furthermore, in a case where in the subframe n, a Most Significant Bit (MSB) of the uplink index that is included in the uplink grant that corresponds to the cell where the UL-DL configuration 0 is set to be applied is set to 1, the terminal apparatus 1 performs the transmission on the PUSCH that corresponds to the uplink grant, in the subframe n+k that is specified based on the table in FIG. 12.

Furthermore, in a case where, in a first resource set where the subframe n=0, or n=5, the PHICH that involves the NACK that corresponds to the cell where the UL-DL configuration 0 is set to be applied is received, the terminal apparatus 1 performs the transmission on the PUSCH that corresponds to the PHICH, in the subframe n+k that is specified based on the table in FIG. 12.

Furthermore, in a case where in the subframe n, a Least Significant Bit (LSB) of the uplink index that is included in the uplink grant that corresponds to the cell where the UL-DL configuration 0 is set to be applied is set to 1, the terminal apparatus 1 performs the transmission on the PUSCH that corresponds to the uplink grant, in the subframe n+7.

Furthermore, in a case where, in a second resource set when the subframe n=0, or n=5, the PHICH that involves the NACK that corresponds to the cell where the UL-DL configuration 0 is set to be applied is received, the terminal apparatus 1 performs the transmission on the PUSCH that corresponds to the uplink grant, in the subframe n+7.

Furthermore, when the subframe n=1, or n=6, in a case where the PHICH that involves the NACK that corresponds to the cell where the UL-DL configuration 0 is set to be applied is received, the terminal apparatus 1 performs the transmission on the PUSCH that corresponds to the uplink grant, in the subframe n+7.

Furthermore, for example, in a case where in [SFN=m, subframe 1], the PDCCH/EPDCCH/PHICH that corresponds to the cell where the UL-DL configuration 0 is set to be applied is detected, the terminal apparatus 1 performs the transmission on the PUSCH, in a subframe [subframe SFN=m, subframe 7] that follows after 6.

Furthermore, the first configuration may be used to specify a correspondence between the subframe n in which the PHICH is allocated and a subframe n−k in which the PUSCH that the PHICH corresponds to is allocated.

FIG. 13 is a diagram illustrating an example of the correspondence between the subframe n in which the PHICH is allocated, and the subframe n−k in which the PUSCH that the PHICH corresponds to is allocated, according to the present embodiment. When descriptions are provided below referring to FIG. 13, the first configuration is also simply referred to as the UL-DL configuration.

The terminal apparatus 1 specifies the value of k, based on a table illustrated in FIG. 13. Here, the subframe n and the subframe n−k are subframes that are intended for the terminal apparatus 1 (at the terminal apparatus 1 side).

For example, for a cell where the UL-DL configurations 1 to 6 are set to be applied, in the subframe n, the HARQ-ACK (also possibly the HARQ indicator) that is received on the PHICH that corresponds to the cell is associated with the transmission on the PUSCH, in the subframe n−k that is specified based on a table in FIG. 13.

Furthermore, for a cell where the UL-DL configuration 0 is set to be applied, in the first resource set when the subframe n=0, or n=5, or when the subframe n=1, or n=6, the HARQ-ACK that is received on the PHICH that corresponds to the cell is associated with the transmission on the PUSCH, in the subframe n−k that is specified based on the table in FIG. 13.

Furthermore, for a cell where the UL-DL configuration 0 is set to be applied, in the second resource set when the subframe n=0, or n=5, the HARQ-ACK that is received on the PHICH that corresponds to the cell is associated with the transmission on the PUSCH, in a subframe n−6.

Furthermore, for example, for a cell where a UL-DL configuration 1 is set to be applied, in [SFN=m, subframe 1], the HARQ-ACK that is received through the PHICH is associated with the transmission on the PUSCH, in a subframe [SFN=m−1, subframe 7] of four subframes previously.

Furthermore, the first configuration may be used to specify a correspondence between the subframe n in which the PUSCH is allocated and a subframe n+k in which the PHICH that the PUSCH corresponds to is allocated.

FIG. 14 is a diagram illustrating an example of the correspondence between the subframe n in which the PUSCH is allocated, and the subframe n+k in which the PHICH that the PUSCH corresponds to is allocated, according to the present embodiment. When descriptions are provided below referring to FIG. 14, the first configuration is also simply referred to as the UL-DL configuration.

The terminal apparatus 1 specifies the value of k, based on a table illustrated in FIG. 14. Here, the subframe n and the subframe n+k are subframes that are intended for the terminal apparatus 1 (at the terminal apparatus 1 side).

In a case where in the subframe n, the transmission on the PUSCH is scheduled, the terminal apparatus 1 determines a PHICH resource in the subframe n+k that is specified in the table in FIG. 14.

For example, in a case where, for the cell where the UL-DL configuration 0 is set to be applied, in [SFN=m, subframe n=2], the transmission on the PUSCH is scheduled, the PHICH resource is determined in [SFN=m, subframe n=6].

The HARQ timing for the downlink will be described. For example, the second configuration may be used to specify a correspondence between the subframe n in which the PDSCH is arranged and the subframe n+k in which the HARQ-ACK that corresponds to the PDSCH is transmitted.

FIG. 15 is a diagram illustrating an example of a correspondence between a subframe n−k in which the PDSCH is allocated and the subframe n in which the HARQ-ACK that the PDSCH corresponds to is transmitted, according to the present embodiment. When descriptions are provided below referring to FIG. 15, the second configuration is also simply referred to as the UL-DL configuration.

The terminal apparatus 1 specifies the value of k, based on a table illustrated in FIG. 15. Here, the subframe n−k and the subframe n are subframes that are intended for the terminal apparatus 1 (at the terminal apparatus 1 side).

The terminal apparatus 1 transmits the HARQ-ACK in the subframe n in a case where the transmission on the PDSCH, that is intended for the terminal apparatus 1 and for which the HARQ-ACK should be transmitted, is detected within the subframe n−k (k is specified in a table in FIG. 15) of a cell.

For example, in response to the transmission on the PDSCH that is scheduled by the DCI format with the CRC scrambled by the C-RNTI, the terminal apparatus 1 may perform the HARQ-ACK response.

For example, when the subframe n=2, the terminal apparatus 1 replies to the PDSCH that is received in the subframe n−6 and/or n−7 from the cell where the UL-DL configuration 1 is set to be applied, with the HARQ-ACK.

Here, for the cell where the dynamic TDD is not set to be applied, the second configuration may not be defined. In this case, the base station apparatus 3 and the terminal apparatus 1 may perform processing based on the first configuration (serving cell UL-DL configuration) instead of performing the processing based on the second configuration described above.

Here, in a case where the adjacent cell and the serving cell are different in UL-DL configuration, an interference state differs from one subframe to another. Accordingly, according to the present embodiment, at least two (multiple) subframe sets are defined. Here, for example, the multiple subframe sets are ones associated with the transmission power control for the uplink. Furthermore, the multiple subframe sets are ones associated with power headroom reporting. For example, the subframe set may be configured based on the interference state.

Figure 16:
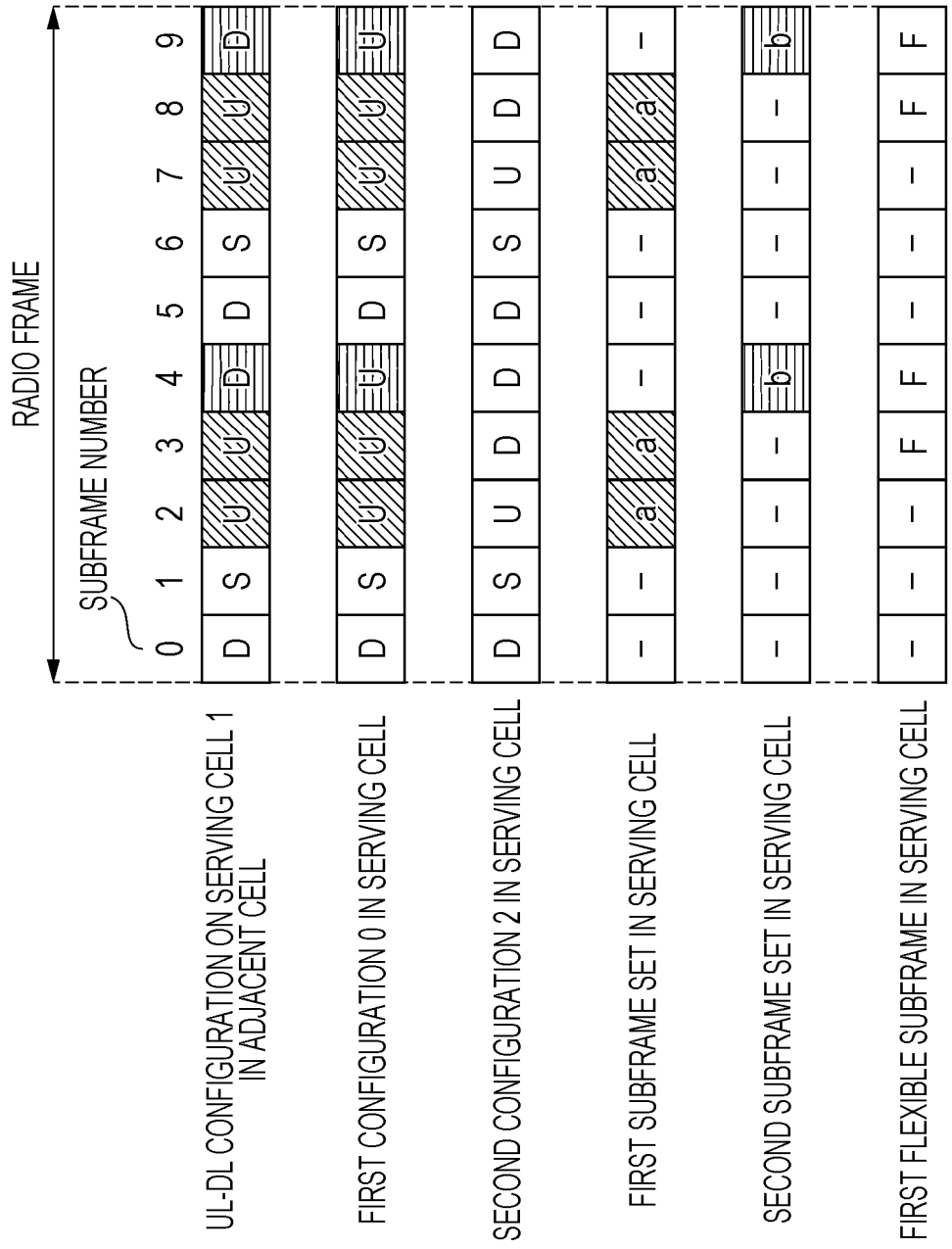
FIG. 16 is a diagram illustrating one configuration example of a subframe set.

FIG. 16 is a diagram illustrating one configuration example of the subframe set according to the present embodiment. In FIG. 16, D indicates the downlink subframe, U indicates the uplink subframe, and S indicates the special subframe. Furthermore, in FIG. 16, a indicates a subframe that belongs to a first subframe set, and b indicates a subframe that belongs to a second subframe set. Furthermore, F indicates the first flexible subframe.

In FIG. 16, in subframes {2, 3, 4, 7, 8, and 9} in the serving cell, the uplink transmission is performed (or there is the likelihood of performing the uplink transmission). Furthermore, in subframes {0, 1, 4, 5, 6, and 9} in the adjacent cell, the downlink transmission is performed, and in subframes {2, 3, 7, and 8} in the adjacent, the uplink transmission is performed.

That is, in the serving cell, the interference state in the subframes {2, 3, 7, and 8} is different from that of the subframes {4 and 8} (or there is the likelihood that the interference state will do so). Accordingly, as illustrated in FIG. 16, the first subframe set is configured from the subframes {2, 3, 7, and 8}. Furthermore, the second subframe set is configured from the subframes {4 and 8}.

For example, the base station apparatus 3 may transmit information indicating the subframe set to the terminal apparatus 1 using the higher-layer signaling. Furthermore, the terminal apparatus 1 may set the subframe set based on the information indicating the subframe set, which is transmitted using the higher-layer signaling.

Furthermore, the subframe set may be implicitly configured based on the first flexible subframe. For example, the first subframe set is configured from the first flexible subframe, and the second subframe set is configured from the subframe that is designated as the uplink subframe based on the first configuration.

Here, in the uplink in the radio communication system, because power consumption by the terminal apparatus 1 is suppressed, or interference with other cells is reduced, Transmission Power Control (TPC) is performed.

For example, in a case where the transmission on the PUSCH is performed and the transmission on the PUCCH is not simultaneously performed, the terminal apparatus 1 may set a transmission power value for the transmission on the PUSCH in a certain subframe i for a certain cell c, based on Equation (1). SetX in Equation is described below as indicating an X-th subframe. For example, X is a natural number.

$P_{real,c,setX}(i)$ in Equation (1) is defined based on Equation (2).

[Math. 1]

$$P_{PUSCH,c}(i) = \min\{P_{CMAX,c}(i), P_{real,c,setX}(i)\} \text{ [dBm]} \quad (1)$$

[Math. 2]

$$P_{real,c,setX}(i) = 10\log_{10}(M_{PUSCH,c}(i)) + P_{0\_PUSCH,c,setX}(j) + \alpha_{c,setX}(j) \cdot PL_c + \Delta_{TF,c}(i) + f_{c,setX}(i) \quad (2)$$

Here, Preal,c,setX(i) is a power value that is computed (estimated) based on a real transmission with respect to the PUSCH. Furthermore, the computation (estimation) of the power value based on the real transmission for the PUSCH includes the meaning of the computation (estimation) of the power value based on the real transmission on the PUSCH.

For example, in a case where the transmission on the PUSCH is performed and the transmission on the PUCCH is simultaneously performed, the terminal apparatus 1 may set a transmission power value for the transmission on the PUSCH in a certain subframe i for a certain cell c, based on Equation (3).

[Math. 3]

$$P_{PUSCH,c}(i) = \min\{10\log_{10}(p_{CMAX,c}(i) - p_{PUCCH,c}(i)), P_{real,c,setX}(i)\} \text{ [dBm]} \quad (3)$$

Here, $P_{PUSCH,c}(i)$ indicates the transmission power value with respect to the transmission on an i-th subframe. Furthermore, min{X, Y} is a function for selecting a minimum value from X and Y. Furthermore, $P_{CMAC,c}$ indicates a maximum transmission power value and is set by the terminal apparatus 1.

Furthermore, $p_{CMAX,c}$ indicates a linear value of $P_{CMAX,c}$. Furthermore, $p_{PUCCH}$ indicates a linear value of $P_{PUCCH}(i)$. $P_{PUCCH}(i)$ is described below.

Furthermore, $M_{PUSCH,c}$ indicates the PUSCH resource (for example, the bandwidth) that is allocated by the base station apparatus 3 and is expressed by the number of resource blocks. Furthermore, $P_{0\_PUSCH,c,setX}$ is a parameter indicating the transmission power that is a basis for the transmission on the PUSCH. For example, $P_{0\_PUSCH,c,setX}$ is composed of a sum of a cell-specific parameter $P_{0\_NOMINAL\_PUSCH,c,setX}$ that is indicated by the higher layer, and a user equipment-specific parameter $P_{0\_UE\_PUSCH,c,setX}$ that is indicated by the higher layer.

The base station apparatus 3 may transmit information for indicating $P_{0\_PUSCH,c,setX}$ to the terminal apparatus 1 for each subframe set using the higher-layer signaling. That is, $P_{0\_PUSCH,c,setX}$ in each of the first subframe set and the second subframe set may be independently configured for the transmission on the PUSCH. The base station apparatus 3 may configure the cell-specific parameter $P_{0\_NOMINAL\_PUSCH,c,setX}$ and/or the user equipment-specific parameter $P_{0\_UE\_PUSCH,c,setX}$ for each subframe set.

Furthermore, the cell-specific parameter $P_{0\_NOMINAL\_PUDVH,c,setX}$ may be configured as a parameter that is common to multiple subframe sets. That is, the base station apparatus 3 may configure the cell-specific parameter $P_{0\_NOMINAL\_PUSCH,c,setX}$ as a parameter common to multiple subframes sets and may configure the user equipment-specific parameter $P_{0\_US\_PUSCH,c,setX}$ for each subframe set. Furthermore, the user equipment-specific parameter $P_{0\_UE\_PUSCH,c,setX}$ may be configured as a parameter that is common to multiple subframe sets.

Furthermore, $PL_c$ indicates a downlink pathloss estimate for a certain cell and is calculated in the terminal apparatus 1. Here, $PL_c$ may be common to multiple subframe sets.

Furthermore, $\alpha_{c,setX}$ indicates a coefficient by which the pathloss is multiplied and is indicated by the higher layer. For example, the base station apparatus 3 may transmit information for indicating $\alpha_{c,setX}$ to the terminal apparatus 1 for each subframe set using the higher-layer signaling. That is, $\alpha_{c,setX}$ may be independently configured for the transmission on the PUSCH in each of the first subframe set and the second subframe set.

Here, $P_{0\_PUSCH,c,setX}$ and a $\alpha_{c,setX}$ are also referred to as open loop parameters. That is, at least two subframe sets are configured, and the open loop parameters ($P_{0\_PUSCH,c,setX}$ and $\alpha_{c,setX}$) are configured for each of the subframe sets.

For example, only in a case where multiple subframe sets are configured for the terminal apparatus 1, the base station apparatus 3 may configure the open loop parameter for each subframe set. Furthermore, only in a case where the second information is configured for the terminal apparatus 1, the base station apparatus 3 may set the open loop parameter for each subframe set.

Furthermore, $\Delta_{TF,c}(i)$ indicates an offset value due to the modulation scheme and the like. Furthermore, a PUSCH power control adjustment state for the transmission on the PUSCH is given by $f_{c,setX}(i)$. Here, an indication of whether accumulation in $f_{c,setX}(i)$ is enabled or disabled is given by the higher layer, based on a parameter (Accumulation-enabled). The parameter that is used to give the indication of whether the accumulation in $f_{c,setX}(i)$ is enabled or disabled is also referred to below as a fourth parameter.

The base station apparatus 3 may transmit the fourth parameter using the higher-layer signaling. For example, in a case where the accumulation is enabled based on the fourth parameter given by the higher layer, the terminal apparatus 1 sets a value of $f_{c,setX}(i)$ based on Equation (4).

[Math. 4]

$$f_{c,setX}(i) = f_{c,setX}(i-1) + \delta_{PUSCH,c,setX}(i-K_{PUSCH}) \text{ if accumulation is enabled} \quad (4)$$

Here, $\delta_{PUSCH,c,setX}$ is a correction value, and is referred to as a TPC command. That is, in a case where the accumulation is enabled based on the fourth parameter given by the higher layer, $\delta_{PUSCH,c,setX}(i-K_{PUSCH})$ indicates a value that is accumulated in $f_{c,setX}(i-1)$. Here, $\delta_{PUSCH,c,setX}(i-K_{PUSCH})$ is indicated based on the value, which is received in a certain subframe $(i-K_{PUSCH})$ and which is set to be in a TPC command field for the PUSCH that is included in the uplink grant corresponding to a certain cell.

For example, values that are set to be in the TPC command field (2-bit information field) for the PUSCH that is included in the uplink grant are mapped to accumulated correction values {-1, 0, 1, and 3}. Furthermore, a value of $K_{PUSCH}$ is defined in advance by a specification and the like, based on the UL-DL configuration (uplink reference UL-DL configuration) and the subframe in which the uplink grant in which the corresponding TPC command is included is received. For example, the value of $K_{PUSCH}$ is 4, 5, 6, or 7.

Here, the accumulation in $f_{c,setX}(i)$ may be performed for each subframe set. That is, $f_{c,setX}(i)$ is independently accumulated for the transmission on the PUSCH in each of the first subframe set and the second subframe.

That is, in a case where the TPC command that corresponds to the first subframe set is received, the terminal apparatus 1 may perform the accumulation in $f_{c,setX(X-1)}(i)$ in the first subframe set. Furthermore, in a case where the TPC command corresponding to the second subframe set is received, the terminal apparatus 1 may perform the accumulation in $f_{c,setX(X=2)}(i)$ in the second subframe set.

That is, the terminal apparatus 1 may set the transmission power value for the transmission on the PUSCH in the subframe that belongs to the X-th subframe set, based on a set of parameters ($P_{O\_PUSCH,c,setX}$, and/or $\alpha_{c,setX}$, and/or $f_{c,setX}(i)$).

Here, for example, in a case where multiple subframe sets are configured, and the parameter value for the second subframe set is configured (in a case where information indicating the parameter value for the second subframe set is received), the terminal apparatus 1 may set the transmission power value for the transmission on the PUSCH in the subframe that belongs to the second subframe set, based on the value that is configured.

Furthermore, in a case where multiple subframe sets are configured, the parameter value for the first subframe set is configured, and the parameter value for the second subframe set is not configured (in a case where the information indicating the parameter value for the second subframe set is not received), the terminal apparatus 1 may set the transmission power value for the transmission on the PUSCH in the subframe that belongs to the second subframe set, based on the value for the first frame set.

That is, in this case, the parameter value for the first subframe set is configured to the parameter for the second subframe set. Here, a default value of a parameter for the first subframe set is defined in advance by the specification or the like.

Furthermore, in a case where the accumulation based on the fourth parameter given by a higher layer is disabled (that is, in case where the accumulation is not enabled), the terminal apparatus 1 sets a value of $f_{c,setX}(i)$, based on Equation (5).

[Math. 5]

$$f_{c,setX}(i) = \delta_{PUSCH,c,setX}(i-K_{PUSCH}) \text{ if accumulation is not enabled} \quad (5)$$

That is, in the case where the accumulation based on the fourth parameter given by the higher layer is disabled, $\delta_{PUSCH,c,setX}(i-K_{PUSCH})$ indicates an absolute value for $f_c(i)$. In this case, $\delta P_{USCH,c,setX}(i-K_{PUSCH})$ may be set regardless of the subframe set. That is, $\delta P_{USCH,c,setX}(i-K_{PUSCH})$ may be enabled for the subframe i.

For example, values that are set to be in the TPC command field (2-bit information field) for the PUSCH that is included in the uplink grant (the DCI format 0 or the DCI format 4) are mapped to absolute values {−4, −1, 1, and 4}.

Furthermore, the base station apparatus 3 may configure the indication of whether the accumulation in $f_{c,setX}(i)$ for each of the subframe sets is enabled or disenabled, for the terminal apparatus 1, using the fourth parameter. That is, based on the fourth parameter, the terminal apparatus 1 may determine whether the value of $f_{c,setX}(i)$ for each of the fourth parameters is an accumulated value or is set to an absolute value.

For example, in a case where multiple subframe sets are configured, and the accumulation is enabled based on the fourth parameter, the terminal apparatus 1 may accumulate the value of $f_{c,setX}(i)$ for each of the subframe sets. For example, in a case where the second configuration is set, and the accumulation is enabled based on the fourth parameter, the terminal apparatus 1 may accumulate the value of $f_{c,setX}(i)$ for each of the subframe sets.

Furthermore, in a case where multiple subframe sets are not configured, and the accumulation is enabled based on the fourth parameter, the terminal apparatus 1 may accumulate the value of $f_{c,setX}(i)$ regardless of the subframe set. Furthermore, in a case where the second configuration is not set (that is, only the first configuration is set), and the accumulation is enabled based on the fourth parameter, the terminal apparatus 1 may accumulate the value of $f_{c,setX}(i)$ regardless of the subframe set.

Furthermore, in a case where multiple subframe sets are configured, and the accumulation is disabled based on the fourth parameter, the terminal apparatus 1 may set the value of $f_{c,setX}(i)$ to an absolute value. Furthermore, in a case where the second configuration is not set and the accumulation is disabled based on the fourth parameter, the terminal apparatus 1 may set the value of $f_{c,setX}(i)$ to an absolute value.

Furthermore, in a case where multiple subframe sets are not configured, and the accumulation is disabled based on the fourth parameter, the terminal apparatus 1 may set the value of $f_{c,setX}(i)$ to an absolute value. Furthermore, in a case where the second configuration is not set and the accumulation is disabled based on the fourth parameter, the terminal apparatus 1 may set the value of $f_{c,setX}(i)$ to an absolute value.

That is, regardless of whether or not multiple subframe sets are configured, and/or whether the second configuration is set, in a case where the accumulation is disabled based on the fourth parameter, the terminal apparatus 1 may set the value of $f_{c,setX}(i)$ to an absolute value.

Furthermore, in a case of performing the transmission on the PUCCH, the terminal apparatus 1 sets the transmission power value for the transmission on the PUCCH in a certain subframe i for a certain cell c, based on Equation (6). $P_{real\_PUCCH,c}(i)$ in Equation (6) is defined based on Equation (7).

[Math. 6]

$$P_{PUCCH,c}(i) = \min\{P_{CMAX,c}, P_{real\_PUCCH,c}(i)\} \text{ [dBm]} \quad (6)$$

[Math. 7]

$$P_{real\_PUCCH,c}(i) = P_{O\_PUCCH,c} + PL_c + h(n_{CQI}, n_{HARQ}) + \Delta_{F\_PUCCH}(F) + g(i) \quad (7)$$

Here, Preal_PUCCH,c(i) is a power value that is computed (estimated) based on the real transmission with respect to the PUCCH. Furthermore, the computation of the power value based on the real transmission for the PUCCH includes the meaning of the computation (estimation) of the power value based on the real transmission on the PUCCH.

Furthermore, $P_{PUCCH,c}(i)$ indicates the transmission power value for the communication on the PUCCH in the i-th subframe. That is, $P_{PUCCH,c}(i)$ may be set regardless of the subframe set. Furthermore, $P_{O\_PUCCH,c}$ is a parameter indicating the transmission power that is a basis for the transmission on the PUCCH, and is indicated by the higher layer.

Furthermore, h(nCQI,nHARQ) is a value that is computed based on the number of bits that are transmitted on the PUCCH, and on a PUCCH format. Here, nCQI indicates channel state information that is transmitted on the PUCCH, and nHARQ indicates HARQ information (for example, the ACK/NACK) that is transmitted on the PUCCH.

Furthermore, $\Delta_{F\_PUCCH}(F)$ is an offset value that is indicated for each PUCCH format by the higher layer. For example, $\Delta_{F\_PUCCH}(F)$ is always set to 0 for a PUCCH format 1a. Furthermore, the terminal apparatus 1 may set a value of g(i), based on Equation (8).

[Math. 8]

$$g(i)=g(i-1)+\delta_{PUCCH}(i-K_{PUCCH}) \quad (8)$$

Here, $\delta_{PUCCH}$ is a correction value and is referred to as a TPC command. That is, $\delta_{PUCCH}(i-K_{PUCCH})$ indicates a value that is accumulated in g(i-1). Here, $\delta_{PUSCH}(i-K_{PUCCH})$ is indicated based on the value, which is received in a certain subframe ($i-K_{PUCCH}$) and which is set to be in the TPC command field for the PUCCH that is included in the downlink assignment corresponding to a certain cell.

For example, values that are set to be in the TPC command field (2-bit information field) for the PUCCH that is included in the downlink assignment are mapped to the accumulated correction values {−1, 0, 1, and 3}. Furthermore, a value of $K_{PUCCH}$ is defined in advance by the specification and the like, based on the UL-DL configuration (downlink reference UL-DL configuration) and the subframe in which the downlink assignment in which the corresponding TPC command is included is received.

Here, the communication on the PUCCH may be performed only in the primary cell. Furthermore, the transmission on the PUCCH may be performed only in the fixed uplink subframe. Furthermore, the transmission on the PUCCH may be performed only in a subframe that belongs to a first subframe set or a subframe that belongs to a second subframe subset.

The Power Headroom Reporting (PHR) will be described in detail.

The terminal apparatus 1 transmits the power headroom (power reserve value) indicating a difference between a maximum transmission power and a certain power estimated for the uplink transmission to the base station apparatus 3. That is, the power headroom reporting is used to provide the base station apparatus 3 with a difference between the maximum transmission power (also referred to as a nominal maximum transmission power) and the estimated power for the transmission on the UL-SCH (also possibly the PUSCH) per activated cell.

That is, the power headroom reporting is used to provide the base station apparatus 3 how much power reserve the terminal apparatus 1 will have with respect to the maximum transmission power after performing the transmission on the PUSCH. Here, the power headroom reporting may be used to provide the base station apparatus 3 with a difference between the maximum transmission power and the estimated power for the transmission on the UL-SCH (also possibly the PUSCH) and the PUCCH. Furthermore, the power headroom reporting may be used to provide the base station apparatus 3 with a maximum transmission power value. Furthermore, the power headroom is provided from the physical layer to the higher layer and is reported to the base station apparatus 3.

For example, the base station apparatus 3 determines allocation of a resource (for example, the bandwidth) or a modulation scheme and the like for the PUSCH, based on a power headroom value.

Here, two types (a type 1 and a type 2) of the power headroom reports are defined. A certain power headroom is valid for a certain subframe i for a certain cell c. Furthermore, the type-1 power headroom includes type-1-1, type-1-2, and type-1-3 power headrooms. Furthermore, the type-2 power headroom includes type-2-1, type-2-2, type 2-3 and type-2-4 power headrooms. The type-1 power headroom and the type-2 power headroom are simply also referred to below as power headrooms.

The type-1-1 power headroom is defined for a case where, in a certain subframe i for a certain cell c, the terminal apparatus 1 performs the transmission on the PUSCH and does not simultaneously perform the transmission on the PUCCH. Here, the base station apparatus 3 may configure the simultaneous transmission on the PUCCH and the PUSCH in a certain subframe i using a parameter (a simultaneousPUCCH-PUSCH). The base station apparatus 3 may transmit the parameter (simultaneousPUCCH-PUSCH) to the terminal apparatus 1 in a state where the parameter is included in the higher-layer signaling.

For example, in a case where, in a certain subframe i for a certain cell c, the transmission on the PUSCH is performed and the transmission on the PUCCH is not simultaneously performed, the terminal apparatus 1 computes the type-1-1 power headroom for the transmission on the PUSCH in the certain subframe i, based on Equation (9).

[Math. 9]

$$PH_{type\ 1,c}(i)=P_{CMAX,c}(i)-P_{real,c,setX}(i)\ [\text{dB}] \quad (9)$$

That is, the type-1-1 power headroom is computed based on the real transmission for the PUSCH. Here, the computation of the power headroom based on the real transmission for the PUSCH includes the meaning of the computation of the power headroom based on the real transmission on the PUSCH.

Furthermore, the type-1-2 power headroom reporting is defined for a case where, in a certain subframe i for a certain cell c, the terminal apparatus 1 performs the transmission on the PUSCH and simultaneously perform the transmission on the PUCCH.

For example, in a case where, in a certain subframe i for a certain cell c, the transmission on the PUSCH is performed and the transmission on the PUCCH is simultaneously performed, the terminal apparatus 1 computes the type-1-2 power headroom for the transmission on the PUSCH in the certain subframe i, based on Equation (10).

[Math. 10]

$$PH_{type\ 1,c}(i)=P_{CMAX\_A,c}(i)-P_{real,c,setX}(i)\ [\text{dB}] \quad (10)$$

That is, the type-1-2 power headroom is computed based on the real transmission for the PUSCH. Here, PCMAC_A is a maximum transmission power value that is computed under the assumption that the transmission on only the PUSCH is performed in a certain subframe i. In this case, the physical layer supplies PCMAX_A to a higher layer instead of PCMAX.

Furthermore, the type-1-3 power headroom reporting is defined for a case where, in a certain subframe i for a certain cell c, the terminal apparatus 1 does not perform the transmission on the PUSCH.

For example, in a case where, in a certain subframe i for a certain cell c, the transmission on the PUSCH is not performed, the terminal apparatus 1 computes the type-1-3 power headroom for the transmission on the PUSCH in the certain subframe i, based on Equation (11). Here, Preference,c,setX(i) in Equation (11) is defined based on Equation (12).

[Math. 11]

$$PH_{type1,c}(i)=P_{CMAX\_B,c}(i)-P_{reference,c,setX}(i)\ [\text{dB}] \quad (11)$$

[Math. 12]

$$P_{reference,c,setX}(i)=P_{O\_PUSCH,c,setX}(1)+\alpha_{c,setX}(1)\cdot PL_c+f_{c,setX}(i) \quad (12)$$

Here, PCMAX_B is computed under the assumption that Maximum Power Reduction (MPR)=0 dB, Additional Maximum Power Reduction (AMPR)=0 dB, Power management Maximum Power Reduction (P-MPR)=0 dB, and Tc=0 dB. Here, values of MPR, A-MPR, P-MPR, and Tc are parameters that are used to set a value of PCMAX,c.

That is, the type-1-3 power headroom is computed based on a reference format for the PUSCH. Here, the computation of the power headroom based on the reference format for the PUSCH includes the meaning of the computation of the power headroom based on the transmission on the PUSCH, in which the reference format is used.

Furthermore, Preference,c,setX(i) is a power value that is computed (estimated) based on the reference format for the PUSCH. Here, the computation (estimation) of the power value based on the reference format for the PUSCH includes the meaning of the computation (estimation) under the assumption that the reference format is used in the transmission on the PUSCH.

That is, it is assumed that as the reference format for the PUSCH, $M_{PUSCH,c}=1$ is used in the transmission on the PUSCH in a certain subframe i. Furthermore, $P_{0\_PUSCH,c,setX}(1)$ is assumed as the reference format for the PUSCH. Furthermore, $\alpha_{c,setX}(1)$ is assumed as the reference format of the PUSCH. Furthermore, $\Delta_{TF,c}(i)=0$ is assumed as the reference format for the PUSCH.

Here, the type-2-1 power headroom reporting is defined for a case where, in a certain subframe i for a certain cell c, the terminal apparatus 1 performs the transmission on the PUSCH and simultaneously performs the transmission on the PUCCH.

For example, in a case where, in a certain subframe i for a certain cell c, the transmission on the PUSCH is performed and the transmission on the PUCCH is simultaneously performed, the terminal apparatus 1 computes the type-2-1 power headroom for the transmission on the PUSCH in the certain subframe i, based on Equation (13).

[Math. 13]

$$PH_{type2,c}(i) = P_{CMAX,c}(i) - 10\log_{10}\left(10^{P_{real,c,setX}(i)/10} + 10^{P_{real\_PUCCH,c,setX}(i)/10}\right)[\text{dB}] \quad (13)$$

That is, the type-2-1 power headroom is computed based on the real transmission for the PUSCH, and the real transmission for the PUCCH.

Furthermore, the type-2-2 power headroom reporting is defined for a case where, in a certain subframe i for a certain cell c, the terminal apparatus 1 performs the transmission on the PUSCH and does not simultaneously perform the transmission on the PUCCH.

For example, in a case where, in a certain subframe i for a certain cell c, the transmission on the PUSCH is performed and the transmission on the PUCCH is not simultaneously performed, the terminal apparatus 1 computes the type-2-2 power headroom for the transmission on the PUSCH in the certain subframe i, based on Equation (14). Here, Preference_PUCCH,c(i) in Equation (14) is defined based on Equation (15).

[Math. 14]

$$PH_{type2,c}(i) = P_{CMAX,c}(i) - 10\log_{10}\left(10^{P_{real,c,setX}(i)/10} + 10^{P_{reference\_PUCCH,c}(i)/10}\right)[\text{dB}] \quad (14)$$

[Math. 15]

$$P_{reference\_PUCCH,c}(i) = P_{0\_PUCCH,c} + PL_c + g(i) \quad (15)$$

That is, the type-2-2 power headroom is computed based on the real transmission for the PUSCH, and the reference format for the PUCCH. Here, the computation of the power headroom based on the reference format for the PUCCH includes the meaning of the computation of the power headroom under the assumption that the reference format is used in the transmission on the PUCCH.

Furthermore, Preference_PUCCH,c(i) is a power value that is computed (estimated) based on the reference format of the PUCCH. Here, the computation (estimation) of the power value based on the reference format for the PUCCH includes the meaning of the computation (estimation) under the assumption that the reference format is used in the transmission on the PUCCH.

That is, $h(n_{CQI}, n_{HARQ})=0$ is assumed as the reference format for the PUCCH. Furthermore, $\Delta_{F\_PUCCH}(F)=0$ is assumed as the reference format for the PUCCH. Furthermore, the PUCCH format 1a is assumed as the reference format for the PUCCH.

Furthermore, the type-2-3 power headroom reporting is defined for a case where, in a certain subframe i for a certain cell c, the terminal apparatus 1 performs the transmission on the PUCCH and does not simultaneously perform the transmission on the PUSCH.

For example, in a case where, in a certain subframe i for a certain cell c, the transmission on the PUCCH is performed and the transmission on the PUSCH is not simultaneously performed, the terminal apparatus 1 computes the type-2-3 power headroom for the transmission on the PUSCH in the certain subframe i, based on Equation (16).

[Math. 16]

$$PH_{type2,c}(i) = P_{CMAX,c}(i) - 10\log_{10}\left(10^{P_{reference,c,setX}(i)/10} + 10^{P_{real\_PUCCH,c,setX}(i)/10}\right)[\text{dB}] \quad (16)$$

That is, the type-2-3 power headroom is computed based on the reference format for the PUSCH and on the real transmission for the PUCCH.

Furthermore, the type-2-4 power headroom reporting is defined for a case where, in a certain subframe i for a certain cell c, the terminal apparatus 1 performs neither the transmission on the PUCCH nor the transmission on the PUSCH.

For example, in a case where, in a certain subframe i for a certain cell c, neither the transmission on the PUCCH nor communication on the PUSCH is performed, the terminal apparatus 1 computes the type-2-4 power headroom for the transmission on the PUSCH in the certain subframe i, based on Equation (17).

[Math. 17]

$$PH_{type2,c}(i) = P_{CMAX\_B,c}(i) - 10\log_{10}\left(10^{P_{reference,c,setX}(i)/10} + 10^{P_{reference\_PUCCH,c}(i)/10}\right)[\text{dB}] \quad (17)$$

That is, the type-2-4 power headroom is computed based on the reference format for the PUSCH and on the reference format for the PUCCH.

Figure 17:
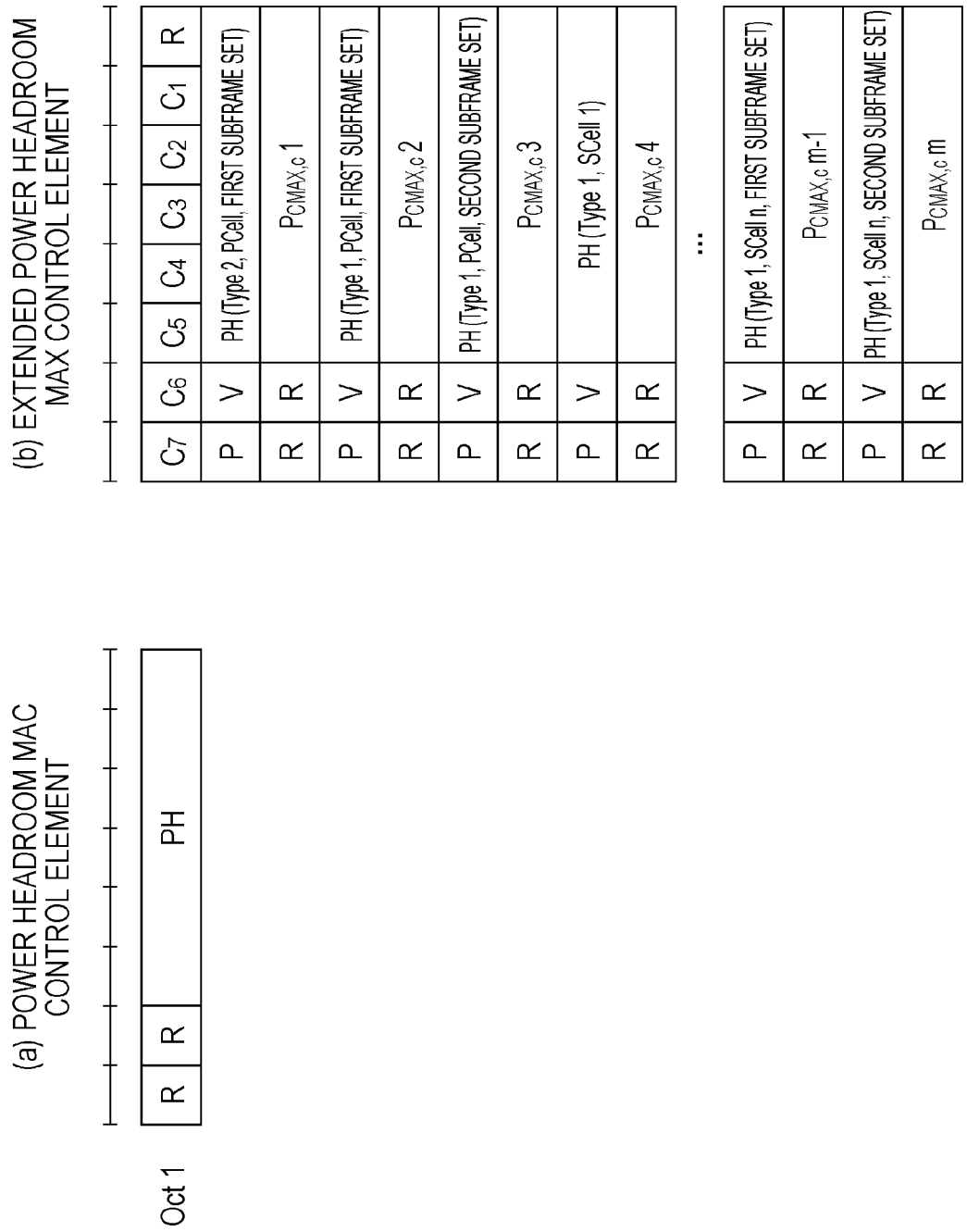
FIG. 17 is a diagram illustrating an example of a structure of a MAC CE that is used in reporting a power headroom.

FIG. 17 is a diagram illustrating an example of a MAC CE structure that is used in the power headroom reporting. In FIG. 17(a), a Power Headroom MAC control element (Power Headroom MAC CE) is illustrated. Furthermore, in FIG. 17(b), an Extended Power Headroom MAC control element (Extended Power Headroom MAC CE) is illustrated.

The Power Headroom MAC control element that is illustrated in FIG. 17(a) is also referred to below as a first structure (first MAC CE). Furthermore, the Power Headroom MAC control element that is illustrated in FIG. 17(b) is also referred to as a second structure (second MAC CE).

Here, using a parameter (extended-PHR) that is included in the higher-layer signaling, the base station apparatus 3 may instruct the terminal apparatus 1 to report the power headroom using the second structure. For example, in a case where two or more cells are configured for the uplink, the base station apparatus 3 may instruct the terminal apparatus 1 to report the power headroom, always using the second structure.

Furthermore, in a case where multiple subframe sets are configured, the base station apparatus 3 may instruct the terminal apparatus 1 to report the power headroom, always using the second structure. Furthermore, in a case where the second configuration is configured, the base station apparatus 3 may instruct the terminal apparatus 1 to report the power headroom, always using the second structure. That is, in a case where information (parameter) relating to the dynamic TDD is configured for the terminal apparatus 1, the base station apparatus 3 may instruct the terminal apparatus to report the power headroom, always using the second structure.

That is, in a case where multiple subframe sets are configured, the base station apparatus 3 may always configure the parameter (extended-PHR). In a case where the information indicating the subframe set is included in the higher-layer signaling, the base station apparatus may always transmit the parameter (extended-PHR) in a state where the parameter (extended-PHR) is included in the higher-layer signaling. That is, the information indicating the subframe set and the parameter (extended-PHR) may be transmitted using a single PDSCH.

That is, based on the parameter (extended-PHR), the terminal apparatus 1 may report the power headroom using the second structure. Furthermore, in a case where the terminal apparatus 1 is not configured to report the power headroom using the second structure based on the parameter (extended-PHR), the terminal apparatus 1 may report the power headroom using the first structure.

For example, in a case where a single cell is configured, and multiple subframes are configured, and the terminal apparatus 1 is not configured to report the power headroom using the second structure based on the parameter (extended-PHR), the terminal apparatus 1 may report one power headroom on any one of the subframe sets, using the first structure.

Here, the first structure that is illustrated in FIG. 17(a) is identified by one MAC PDU subheader in which a Logical Channel Identifier (LCID) is included. Furthermore, the first structure may have a fixed size and may be configured from a single octet. Here, one octet is configured from 8 bits.

For example, the first structure may be defined based on the following fields.

A field R indicates a reserved bit and, for example, is set to "0".

A field PH is used to indicate a power headroom level. For example, the field is 6 bits in length.

FIG. 18 illustrates a power headroom being reported and a corresponding power headroom level. That is, FIG. 18 illustrates the power headroom being reported and a corresponding measured value. As illustrated in FIG. 18, for example, the power headroom reporting ranges from −23 dB to +40 dB.

Furthermore, the second structure that is illustrated in FIG. 17(b) is identified by one MAC PDU subheader in which the LCID is included. The second structure has a variable size.

Here, for each of the serving cells, an octet in which a field for the type-2 power headroom is included and an octet in which a field for associated $P_{CMAX,c}$ is included may be included in the second structure. Furthermore, for each of the subframe sets, the octet in which the field for the type-2 power headroom is included and the octet in which the field for associated $P_{CMAX,c}$ is included may be included in the second structure.

That is, for each of the subframe sets in the serving cell, the octet in which the field for the type-2 power headroom is included and the octet in which the field for associated $P_{CMAX,c}$ is included may be included in the second structure.

Furthermore, for each of the serving cells, an octet in which a field for the type-1 power headroom is included and an octet in which a field for associated $P_{CMAX,c}$ is included may be included in the second structure. Furthermore, for each of the subframe sets, the octet in which the field for the type-1 power headroom is included and the octet in which the field for associated $P_{CMAX,c}$ is included may be included in the second structure.

That is, for each of the subframe sets in the serving cell, the octet in which the field for the type-1 power headroom is included and the octet in which the field for associated $P_{CMAX,c}$ is included may be included in the second structure.

Furthermore, FIG. 17(b) illustrates that the octet in which the field for the type-2 power headroom for the primary cell (PCell) is included and the octet in which the field for associated $P_{CMA,c}$ is included are included.

Furthermore, FIG. 17(b) illustrates that the octet in which the field for the type-1 power headroom for the subframe set 1 for the primary cell is included and the octet in which the field for associated $P_{CMAC,c}$ is included are included. Furthermore, it is illustrated that the octet in which the field for the type-1 power headroom for the subframe set 2 for the primary cell is included and the octet in which the field for associated $P_{CMAC,c}$ is included are included. That is, it is illustrated that multiple subframe sets are set for the primary cell.

Furthermore, FIG. 17(b) illustrates that the octet in which the field for the type-1 power headroom for a secondary cell 1 (SCell 1) is included and the octet in which the field for associated $P_{CMAC,c}$ is included are included. That is, it is illustrated that multiple subframe sets are not set for the secondary cell 1.

Furthermore, FIG. 17(b) illustrates that the octet in which the field for the type-1 power headroom for the subframe set 1 for a secondary cell n (SCell n) is included and the octet in which the field for associated $P_{CMAC,c}$ is included are included. Furthermore, it is illustrated that the octet in which the field for the type-1 power headroom for the subframe set 2 for the secondary cell n is included and the octet in which the field for associated $P_{CMAC,c}$ is included are included. That is, it is illustrated that multiple subframe sets are set for the secondary cell n.

For example, the second structure may be defined based on the following fields.

A field $C_i$ is used to indicate that a field for the power headroom for the secondary cell with a serving cell index (secondary cell index) i is present. For example, in a case where the field $C_i$ is set to "1", it may be indicated that the power headroom for the secondary cell with the serving cell index i is present. For example, in a case where the field $C_i$ is set to "0", it may be indicated that the field for the power headroom for the secondary cell with the serving cell index i is not present.

The field R indicates a reserved bit and, for example, is set to "0".

A field V is used to indicate whether the power headroom value is based on the real transmission or based on the reference format. Here, the real transmission and the reference format are as described above. For example, for the type-1 power headroom, V=0 indicates that the real transmission is used for the PUSCH, and V=1 indicates that the reference format is used for the PUSCH.

Furthermore, for the type-2 power headroom, V=0 indicates that the real transmission is used for the PUCCH, and V=1 indicates that the reference format is used for the PUCCH. Moreover, for both of the type-1 power headroom and the type-2 power headroom, V=0 indicates that the octet in which the field for associated $P_{CMAX,c}$ is included is present, and V=1 indicates that the octet in which the field for associated $P_{CMAC,c}$ is included is omitted.

The field PH is used to indicate a power headroom level. For example, the field is 6 bits long. As described above, the power headroom being reported and the corresponding power headroom level are illustrated in FIG. 18.

A field P is used to indicate whether or not the terminal apparatus 1 applies power back-off due to power management (P-MPR).

A field PCMAC,c, if this field is present, indicates PCMAC,c, PCMAC_A,c, or PCMAX_B,c that is used for the computation of the corresponding power headroom.

As described above, the terminal apparatus 1 may compute the power headroom for each of the multiple subframe sets. The power headroom that is computed based on the set of parameters for the first subframe set is also referred to below as the power headroom for the first subframe set. Furthermore, the power headroom that is computed based on the set of parameters for the second subframe set is also referred to as the power headroom for the second subframe set.

That is, the terminal apparatus 1 may compute the power headroom for the X-th subframe set, based on the set of parameters (P0_PUSCH,c,setX, and/or c,setX, and/or fc,setX(i)) for the X-th subframe set.

Furthermore, the terminal apparatus 1 may report the power headroom for each of the multiple subframe sets, using a certain single subframe. For example, the terminal apparatus 1 may report the power headroom for each of the multiple subframe sets, using the second structure. That is, the terminal apparatus 1 may transmit the power headroom for each of the multiple subframe sets through a single PUSCH, in a state where the power headroom for each of the multiple subframe sets is included in a single MAC CE.

That is, the terminal apparatus 1 may report the power headroom for each of all the subframe sets for each of all activated cells with the uplink, using a certain single subframe (through a single PUSCH in the state where the power headroom for each of all the subframe sets is included in a single MAC CE).

For example, the terminal apparatus 1 may compute the power headroom for the first subframe set and the power headroom for the second subframe set, and may report each of the computed power headrooms, using the subframe that belongs to the first subframe set. Furthermore, the terminal apparatus 1 may compute the power headroom for the first subframe set and the power headroom for the second subframe set, and may report each of the computed power headrooms, using the subframe that belongs to the second subframe set.

Here, in a case where, in a certain subframe for a certain cell, the power headroom reporting is performed using the PUSCH, the terminal apparatus 1 may compute the power headroom for the subframe set to which the subframe in which the power headroom reporting is performed belongs, based on the real transmission for the PUSCH.

Furthermore, in a case where, in a certain subframe for a certain cell, the power headroom reporting is performed using the PUSCH, the terminal apparatus 1 may compute the power headroom for a subframe set different from the subframe set to which the subframe in which the power headroom reporting is performed belongs, based on the reference format for the PUSCH.

That is, in a case where the power headroom is reported on the PUSCH in the subframe that belongs to the first subframe set for a certain cell, the terminal apparatus 1 may report the power headroom for the first subframe set, which is computed based on the real transmission for the PUSCH for the certain cell, and the power headroom for the second subframe set, which is computed based on the reference format for the PUSCH for the certain cell.

Furthermore, in a case where the power headroom is reported on the PUSCH in the subframe that belongs to the second subframe set for a certain cell, the terminal apparatus 1 may report the power headroom for the first subframe set, which is computed based on the reference format for the PUSCH for the certain cell, and the power headroom for the second subframe set, which is computed based on the real transmission for the PUSCH for the certain cell.

Furthermore, the terminal apparatus 1 may compute the power headroom for the subframe set to which the subframe in which the power headroom reporting is performed belongs, and may report the computed power headroom in the subframe.

That is, the terminal apparatus 1 may report only the power headroom for the first subframe set, in the subframe that belongs to the first subframe set. Furthermore, the terminal apparatus 1 may report only the power headroom for the second subframe set, in the subframe that belongs to the second subframe set.

That is, the terminal apparatus 1 may compute the power headroom for the subframe set for each of the activated cells, to which the subframe in which the power headroom reporting is performed on the PUSCH belongs in any one of the activated cells, and may report the computed power headroom, in the subframe.

Here, the terminal apparatus 1 may report the power headroom for the subframe set to which the subframe in which the power headroom reporting is performed belongs, using the first structure. Furthermore, the terminal apparatus 1 may report the power headroom for the subframe set to which the subframe in which the power headroom reporting is performed belongs, using the second structure.

That is, the terminal apparatus 1 may switch between the power headroom reporting for the first subframe set and the power headroom reporting for the second subframe set, based on the subframe set (that is, the first subframe set or the second subframe set) to which the subframe in which the power headroom reporting is performed belongs.

Furthermore, the terminal apparatus 1 may always report the power headroom for any one subframe set, regardless of the subframe set to which the subframe in which the power headroom reporting is performed belongs. For example, the terminal apparatus 1 may always report the power headroom for the first subframe set. Furthermore, the terminal apparatus 1 may always report the power headroom for the second subframe set.

Furthermore, the base station apparatus 3 may transmit information that is used to instruct the terminal apparatus 1 which subframe set the power headroom to be reported is for, in a state where the information is included in the higher-layer signaling.

Here, the terminal apparatus 1 may report the power headroom for any one subframe set, using the first structure. Furthermore, the terminal apparatus 1 may report the power headroom for any one subframe set, using the second structure.

Furthermore, the terminal apparatus 1, which is instructed to always report the power headroom for a certain subframe set, may always compute the power headroom based on the reference format for the PUSCH, when reporting the power headroom in the subframe that belongs to the subframe set different from the subframe set.

That is, in a case where the power headroom for the first subframe set is always reported, the terminal apparatus 1 may report the power headroom for the first subframe set, which is computed based on the reference format for the PUSCH, in the subframe that belongs to the second subframe set.

Furthermore, in a case where the power headroom for the second subframe set is always reported, the terminal apparatus 1 may report the power headroom for the second subframe set that is computed based on the reference format for the PUSCH, in the subframe that belongs to the first subframe set.

Furthermore, in a case where the power headroom is reported, the terminal apparatus 1 may report information that indicates which subframe set the power headroom to be reported is for, in a state where the information is included in the power headroom reporting.

For example, in a case where the power headroom for the first subframe set is reported, the terminal apparatus 1 may report information that indicates that the power headroom for the first subframe set is reported, in the state where the information is included in the power headroom reporting. Furthermore, in a case where the power headroom for the second subframe set is reported, the terminal apparatus 1 may report information that indicates that the power headroom for the second subframe set is reported, in the state where the information is included in the power headroom reporting.

For example, the information that indicates which subframe set the power headroom to be reported is for may be transmitted using a reserved bit in the first structure or the second structure. That is, in a case of indicating which subframe set the power headroom to be reported is for, the terminal apparatus 1 may set the reserved bit to a corresponding value (for example, a value corresponding to the first subframe set, or a value corresponding to the second subframe set).

A method in which the terminal apparatus 1 reports the power headroom for each of the multiple subframe sets in a certain single subframe, as is described above, is also referred to below as a first reporting method.

Furthermore, the method in which in a certain single subframe, the terminal apparatus 1 reports the power headroom for a certain single subframe set is also referred to as a second reporting method. A method in which the terminal apparatus 1 reports the power headroom for the subframe set that the subframe performing the power headroom reporting corresponds to, as described above, is included in the second reporting method. Furthermore, a method in which the terminal apparatus 1 always reports which subframe set the power headroom to be reported is for is included in the second reporting method.

Here, the base station apparatus 3 may instruct the terminal apparatus 1 which of the first reporting method and the second reporting method is used to report the power headroom.

For example, the base station apparatus 3 may instruct the terminal apparatus 1 to report the power headroom using the first reporting method, by configuring the multiple subframe sets. Furthermore, the base station apparatus 3 may instruct the terminal apparatus 1 to report the power headroom using the first reporting method, by configuring the second configuration.

That is, in a case where the multiple subframe sets are configured, the terminal apparatus 1 may report the power headroom using the first reporting method. Furthermore, in a case where the multiple subframe sets are not configured, the terminal apparatus 1 may report the power headroom using the second reporting method. The terminal apparatus 1 may switch between the first reporting method and the second reporting method, based on whether or not the multiple subframe sets are configured.

Furthermore, in a case where the second configuration is configured, the terminal apparatus 1 may report the power headroom using the first reporting method. Furthermore, in a case where the second configuration is not configured (that is, in a case where the first configuration is configured without the second configuration being configured), the terminal apparatus 1 may report the power headroom using the second reporting method. The terminal apparatus 1 may switch between the first reporting method and the second reporting method, based on whether or not the second configuration is configured.

Furthermore, the base station apparatus 3 may instruct the terminal apparatus 1 to report the power headroom using the first reporting method, by instructing the terminal apparatus 1 to report the power headroom using the second configuration (that is, by configuring the parameter (extended-PHR)).

That is, in a case where the parameter (extended-PHR) is configured, the terminal apparatus 1 may report the power headroom using the first reporting method. Furthermore, in a case where the parameter (extended-PHR) is not configured, the terminal apparatus 1 may report the power headroom using the first reporting method. The terminal apparatus 1 may switch between the first reporting method and the second reporting method, based on whether or not the parameter (extended-PHR) is configured.

Furthermore, the base station apparatus 3 may instruct the terminal apparatus 1 to report the power headroom using the first reporting method, by enabling the accumulation in $f_{c,setX}(i)$ for each of the subframe sets. Here, a method of configuration whether the accumulation in $f_{c,setX}(i)$ for each of the subframe sets is enabled or disabled is as described above.

That is, in a case where the accumulation in $f_{c,setX}(i)$ for each of the subframe sets is enabled, the terminal apparatus 1 may report the power headroom using the first reporting method. That is, in a case where the accumulation in $f_{c,setX}(i)$ is performed for each subframe set, the terminal apparatus 1 may report the power headroom for each of the multiple subframe sets.

That is, in a case where the accumulation in $f_{c,setX}(i)$ for at least one subframe set is enabled, the terminal apparatus 1 may report the power headroom using the first reporting method. That is, in a case where the accumulation in $f_{c,setX}(i)$ is performed for at least one subframe set, the terminal apparatus 1 may report the power headroom for each of the multiple subframe sets.

Furthermore, in a case where the accumulation in $f_{c,setX}(i)$ for each of the subframe sets is disabled, the terminal apparatus 1 may report the power headroom using the second reporting method. That is, in a case where the accumulation in $f_{c,setX}(i)$ is not performed for each subframe set, the terminal apparatus 1 may always report the power headroom for a single subframe set. That is, in a case where a value of $f_{c,setX}(i)$ is set to an absolute value, the terminal apparatus 1 may always report the power headroom for a single subframe set.

That is, the terminal apparatus 1 may switch between the first reporting method and the second reporting method, based on whether or not the accumulation in $f_{c,setX}(i)$ is performed for each of the subframe sets.

The type-2 power headroom reporting in a case where the parameter (extended-PHR) and the parameter (simultaneousPUCCH-PUSCH) are configured is described in detail below. As described above, the type-2 power headroom is reported in a case where the parameter (extended-PHR) and the parameter (simultaneousPUCCH-PUSCH) are configured by the base station apparatus 3.

In this case, even though multiple subframe sets are configured, the terminal apparatus 1 may report a single type-2 power headroom. For example, the terminal apparatus 1 may always report the type-2 power headroom for the first subframe set. Furthermore, the terminal apparatus 1 may always report the type-2 power headroom for the second subframe set.

Here, the base station apparatus 3 may instruct the terminal apparatus 1 whether or not the type-2 power headroom for each of the multiple subframe sets has to be reported. For example, the base station apparatus 3 may transmit information for instructing the terminal apparatus 1 whether or not the type-2 power headroom for each of the multiple subframe sets has to be reported, using the higher-layer signaling.

Furthermore, the terminal apparatus 1 may always report the type-2 power headroom for the subframe set to which the subframe in which the transmission on the PUCCH is performed belongs. For example, in a case where the subframe in which the transmission on the PUCCH is performed always belongs to the first subframe set, the terminal apparatus 1 may always compute the type-2 power headroom for the first subframe set. Furthermore, in a case where the subframe in which the transmission on the PUCCH is performed always belongs to the second subframe set, the terminal apparatus 1 may always compute the type-2 power headroom for the second subframe set.

Furthermore, the terminal apparatus 1 may compute the type-2 power headroom for the subframe set to which the subframe in which the power headroom is reported belongs, and may report the computed type-2 power headroom, in the subframe.

For example, in a case where the subframe set to which the subframe in which the power headroom is reported belongs is the first subframe set, the terminal apparatus 1 may compute the type-2 power headroom for the first subframe set and may report the computed type-2 power headroom in the subframe. Furthermore, in a case where the subframe set to which the subframe in which the power headroom is reported belongs is the second subframe set, the terminal apparatus 1 may compute the type-2 power headroom for the second subframe set and may report the computed type-2 headroom, in the subframe.

A method of reporting the type-1 power headroom and the type-2 power headroom is described in detail below. The terminal apparatus 1 can report the type-1 power headroom and the type-2 power headroom using the reporting methods as described above. That is, the terminal apparatus 1 may report the type-1 power headroom and the type-2 power headroom in a combination of some of or all of the reporting methods that are described above.

That is, some of or all of the reporting methods may be applied as a method of reporting the type-1 power headroom. Furthermore, some of or all of the reporting methods may be applied as a method of reporting the type-2 power headroom.

For example, the terminal apparatus 1 may report the type-1 power headroom for each of the multiple subframe sets and the type-2 power headroom for the first subframe set, in a single subframe.

Furthermore, for example, the terminal apparatus 1 may report the type-1 power headroom for the subframe set to which the subframe in which the type-1 power headroom and the type-2 power headroom (that is, the power headroom) are reported belongs, and the type-2 power headroom for the first subframe set, in the subframe.

Furthermore, for example, the terminal apparatus 1 may report the type-1 power headroom for each of the multiple subframe sets and the type-2 power headroom for the subframe set to which the subframe in which the type-2 power headroom is reported belongs, in a single subframe.

Furthermore, for example, the terminal apparatus 1 may report the type-1 power headroom and the type-2 power headroom for the subframe set to which the subframe in which the type-1 power headroom and the type-2 power headroom are reported belongs, in the subframe.

Here, the terminal apparatus 1 may report the power headroom for the first subframe set and the power headroom for the second subframe set, in different subframes, respectively.

Control of the power headroom reporting will be described in detail.

For example, the reporting of one certain power headroom is triggered in a case where at least one among multiple events that are defined in advance occurs. For example, the multiple events are defined in advance by a specification and the like.

For example, the multiple events include an event in which in a case where a first time (prohibit-Timer) expires or has expired, pathloss for at least one activated serving cell that is used as a pathloss reference or for at least one (activated) subframe set that is used as the pathloss reference changes by equal to or more than a set value (dl-pathlossChange) from the moment the last reporting of the power headroom is performed when the terminal apparatus 1 is allocated an uplink resource (for example, an UL-SCH resource, or a PUSCH resource) for initialization transmission.

Here, the first timer (prohibit-Timer) may be configured by the base station apparatus 3, using the higher-layer signaling. Furthermore, the value associated with the change in the pathloss (dl-pathlossChange) may be configured by the base station apparatus 3, using the higher-layer signaling. Furthermore, one cell or one subframe set that is used as the pathloss reference for a certain cell or a certain subframe set may be configured by the base station apparatus 3, using the higher-layer signaling.

Furthermore, the multiple events may include an event in which the multiple subframe sets are configured, are reconfigured, or are activated by the higher layer (using the higher-layer signaling). Furthermore, the multiple events may include an event in which a certain subframe set is configured, is reconfigured, or is activated by the higher layer (using the higher-layer signaling).

Here, for example, the base station apparatus 3 may configure the subframe set using a dedicated message (dedicated signaling) and may activate the subframe set that is configured, using the MAC CE (MAC signaling). Here, the terminal apparatus 1 may not monitor the PDCCH/EPDCCH in the subframe that belongs to the deactivated subframe set. Furthermore, the terminal apparatus 1 may not monitor the PDCCH/EPDCCH for the subframe set that belongs to the deactivated subframe set.

Furthermore, the multiple events may include an event in which a configuration associated with the accumulation in $f_{c,setX}(i)$ is changed. For example, the multiple events may include an event in which the accumulation in $f_{c,setX}(i)$ is changed from a disabled state to an enabled state. Furthermore, for example, the multiple events may include an event in which the accumulation in $f_{c,setX}(i)$ is changed from the enabled state to the disabled state. For example, in a case where the configuration associated with the accumulation in $f_{c,setX}(i)$ is changed, the power headroom reporting may be triggered regardless of the subframe set.

Furthermore, for example, the terminal apparatus 1 reports the power headroom, based on conditions. That is, in a case where the conditions are satisfied, the terminal apparatus 1 performs the power headroom reporting that is triggered based the events described above.

For example, the conditions include a case where for the corresponding subframe, the uplink resource (for example, the UL-SCH resource, or the PUSCH resource) for the initialization transmission is allocated, a case where the reporting of at least one power headroom is triggered, and a case where the first structure and its subheader or the second structure and its subheader can be accommodated in the uplink resource that is allocated based on logical channel prioritization.

Here, in a case where the parameter (extended-PHR) is configured, multiple subframe sets are configured for a certain cell, and the type-1 power headroom is configured to be reported using the first reporting method, the terminal apparatus 1 may obtain (compute) the type-1 power headroom for each of the multiple subframe sets. In this case, the parameter (simultaneousPUCCH-PUSCH) is not configured by the base station apparatus 3.

Furthermore, in a case where the parameter (extended-PHR) is configured, multiple subframe sets are configured for a certain cell, and the type-1 power headroom is configured to be reported using the second reporting method (that is, the type-1 power headroom is not configured to be reported using the first reporting method), the terminal apparatus 1 may obtain the type-1 power headroom value for any one subframe set. In this case, the parameter (simultaneousPUCCH-PUSCH) is not configured by the base station apparatus 3.

Furthermore, in a case where the parameter (extended-PHR) is configured, and multiple subframe sets are not configured for a certain cell, the terminal apparatus 1 may acquire a single type-1 power headroom value for the certain cell. In this case, the parameter (simultaneousPUCCH-PUSCH) is not configured by the base station apparatus 3.

Furthermore, in this case, the terminal apparatus 1 may report the type-1 power headroom using the second reporting method.

That is, in a case where the parameter (extended-PHR) is configured, the terminal apparatus 1 may switch between the obtaining of the power headroom for the multiple subframe sets and the obtaining of the power headroom for a single subframe set, based whether or not the multiple subframe sets are configured for a certain cell.

Moreover, in a case where the parameter (extended-PHR) is configured and the parameter (simultaneousPUCCH-PUSCH) is configured, the terminal apparatus 1 may obtain a type-2 power headroom value.

Furthermore, in a case where the parameter (extended-PHR) is not configured, the terminal apparatus 1 may obtain the type-1 power headroom value for any one subframe set for the primary cell. In this case, the terminal apparatus 1 may report the type-1 power headroom using the second reporting method.

Here, the terminal apparatus 1 may switch between the parameter sets that are used for the computation of the power headroom, according to which of the real transmission for the PUSCH and the reference format for the PUSCH the power headroom is computed based on and according to the subframe set (that is, the first subframe set or the second subframe set) to which the subframe in which the power headroom reporting is performed belongs.

That is, in a case where the power headroom is computed based on the real transmission for the PUSCH, the terminal apparatus 1 may switch between the parameter sets that are used for the computation of the power headroom, based on the subframe set to which the subframe in which the power headroom reporting is performed belongs.

Furthermore, in a case where the power headroom is computed based on the reference format for the PUSCH, the terminal apparatus 1 may always use the set of parameters for any one subframe set, regardless of the subframe set to which the subframe in which the power headroom reporting is performed belongs. For example, in this case, the terminal apparatus 1 may always use the set of parameters for the first subframe set. Furthermore, in this case, the terminal apparatus 1 may use the set of parameters for the second subframe set.

For example, in a case where, in the subframe that belongs to the X-th subframe set for a certain cell, the power headroom reporting is performed based on the real transmission for the PUSCH for the certain cell, the terminal apparatus 1 may compute the power headroom for the X-th subframe set. The terminal apparatus 1 reports the computed power headroom for the X-th subframe set in the subframe. Furthermore, the terminal apparatus 1 may report the computed power headroom for the X-th subframe set using the first structure and the second structure.

That is, in a case where, in the subframe that belongs to the X-th subframe set for a certain cell, the power headroom reporting is performed on the PUSCH for the certain cell, the terminal apparatus 1 may compute the power headroom for the X-th subframe set for the certain cell, for the real transmission on the PUSCH.

Furthermore, in a case where, in the subframe that belongs to the X-th subframe set for a certain cell, the power headroom reporting is performed based on the reference format for the PUSCH for the certain cell, the terminal apparatus 1 may always compute the power headroom for any one subframe set (that is, the first subframe set or the second subframe set). The terminal apparatus 1 reports the computed power headroom for any one subframe set, in the subframe. Furthermore, the terminal apparatus 1 may report the computed power headroom for any one subframe set using the first structure or the second structure.

That is, in a case where, in the subframe that belongs to the X-th subframe set for a certain cell, the power headroom reporting is configured to be performed on the PUSCH in a cell different from the certain cell, the terminal apparatus 1 may compute the power headroom for any one subframe set in the certain cell, for the reference format on the PUSCH.

Furthermore, the terminal apparatus 1 may switch between the set of parameters that is used for the computation of the power headroom, according to which of the real transmission for the PUSCH and the reference format for the PUSCH the power headroom is computed based on, according to the subframe set (that is, the first subframe set or the second subframe set) to which the subframe in which the power headroom reporting is performed belongs, and according to the type of the power headroom reporting.

That is, in a case where the type-1 power headroom is computed based on the real transmission for the PUSCH, the terminal apparatus 1 may switch between the set of parameters that is used for the computation of the type-1 power headroom, based on the subframe set to which the subframe in which the type-1 power headroom reporting is performed belongs.

Furthermore, in a case where the type-1 power headroom is computed based on the reference format for the PUSCH, the terminal apparatus 1 may always use the set of parameters for any one subframe set, regardless of the subframe set to which the subframe in which the type-1 power headroom reporting is performed belongs.

Furthermore, in a case where the type-2 power headroom is computed, the terminal apparatus 1 may always use the set of parameters for any one subframe set, regardless of the subframe set to which the subframe in which the power headroom reporting is performed belongs.

The terminal apparatus 1 can efficiently execute processing associated with the transmission power by executing the transmission power control as described above. Furthermore, the terminal apparatus 1 can efficiently execute the processing associated with the transmission power by reporting the power headroom as described above.

For example, in a system to which the dynamic TDD is applied, the processing associated with the transmission power can be efficiently executed. For example, even though the adjacent cell and the serving cell are different in the UL-DL configuration from each other, the base station apparatus 3 and the terminal apparatus 1 can efficiently communicate with each other by efficiently executing the processing associated with the transmission power.

The terminal apparatus 1 and the base station apparatus 3 can efficiently execute the processing associated with the transmission power by performing the processing as described above.

As described above, the terminal apparatus 1 according to the present embodiment, which communicates with a base station apparatus 3, includes a receiving unit that receives information for configuring multiple subframe sets and a parameter for each of the multiple subframe sets from the base station apparatus 3, and a transmitting unit that reports multiple power headrooms for each of the subframe sets, which are computed based on the parameter, to the base station apparatus 3, in a single subframe.

Here, in a case where, in a certain subframe for a certain serving cell, the power headroom reporting is performed using a physical uplink shared channel, the terminal apparatus 1 computes the power headroom for the subframe set to which the subframe in which the power headroom reporting is performed belongs, based on the real transmission for the physical uplink shared channel.

Furthermore, in the case where, in a certain subframe for a certain serving cell, the power headroom reporting is performed using the physical uplink shared channel, the terminal apparatus 1 computes the power headroom for a subframe set different from the subframe set to which the subframe in which the power headroom reporting is performed belongs, based on the reference format for the physical uplink shared channel.

Furthermore, the base station apparatus 3 according to the present embodiment, which communicates with the terminal apparatus 1, includes a transmitting unit that transmits information for configuring multiple subframe sets, and a parameter for each of the multiple subframe sets to the terminal apparatus 1, and a receiving unit that receives multiple power headrooms for each of the multiple subframe sets, which are computed based on the parameter, from the terminal apparatus 1, in a single subframe.

Here, in the case where in a certain subframe for a certain serving cell, the power headroom reporting is performed using the physical uplink shared channel, the base station apparatus 3 receives the power headroom for the subframe set to which the subframe in which the power headroom reporting is performed belongs, which is computed based on real transmission for the physical uplink shared channel.

Furthermore, in the case where, in a certain subframe for a certain serving cell, the power headroom reporting is performed using the physical uplink shared channel, the base station apparatus 3 receives the power headroom for a subframe set different from the subframe set to which the subframe in which the power headroom reporting is performed belongs, which is computed based on a reference format for the physical uplink shared channel.

A program running on the base station apparatus 3 and the terminal apparatus 1 according to the present invention may be a program (a program for causing a computer to operate) that controls a Central Processing Unit (CPU) and the like in such a manner as to realize the functions according to the embodiment of the present invention, which are described above. Then, the information that is handled in these apparatuses is temporarily stored in a Random Access Memory (RAM) while being processed. Thereafter, the information is stored in various types of ROM such as a Flash Read Only Memory (ROM) or a Hard Disk Drive (HDD) and, whenever necessary, is read by the CPU to be modified or rewritten.

Moreover, one portion of the terminal apparatus 1 and the base station apparatus 3 according to the embodiments, which are described above may be realized by the computer. In that case, the one portion may be realized by recording a program for realizing such control functions on a computer-readable medium and causing a computer system to read the program stored on the recording medium for execution.

Moreover, the "computer system" here is defined as a computer system built into the terminal apparatus 1 or the base station apparatus 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit and a medium that retains the program for a constant period of time, such as a volatile memory within the computer system, which functions as a server or a client in a case of including the program dynamically. Furthermore, the program may be one for realizing some of the functions described above and additionally may be one that can realize the functions described above in combination with a program that is already recorded on the computer system.

Furthermore, the base station apparatus 3 according to the embodiment, which is described, can be realized as an aggregation (an apparatus group) that is configured from multiple apparatuses. Each apparatus that makes up the apparatus group may be equipped with some portion of or all portions of each function or each functional block of the base station apparatus 3 according to the embodiment, which is described. The apparatus group itself may have each general function or each general functional block of the base station apparatus 3. Furthermore, the terminal apparatus 1 according to the embodiment, which is described, can also communicate with the base station apparatus as the aggregation.

Furthermore, the base station apparatus 3 according to the embodiment, which is described, may be also referred to as an Evolved Universal Terrestrial Radio Access Network (E-UTRAN). Furthermore, the base station apparatus 3 according to the embodiment, which is described, may have some portions of or all portions of a function of a higher node above an eNodeB.

Furthermore, some portions of or all portions of the terminal apparatus 1 and the base station apparatus 3 according to the embodiment, which is described, may be realized as an LSI that is a typical integrated circuit and be realized as a chip set. Each functional block of the terminal apparatus 1 and the base station apparatus 3 may be individually realized as a chip, and some of, or all of the functional blocks may be integrated into a chip. Furthermore, a circuit integration technique is not limited to the LSI, and an integrated circuit for the functional block may be realized with a dedicated circuit or a general-purpose processor. Furthermore, if with advances in a semiconductor technology, a circuit integration technology that replaces the LSI appears, it is also possible to use an integrated circuit to which such a technology is applied.

Furthermore, according to the embodiment, as described above, a terminal apparatus or a communication apparatus is provided as one example, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air-conditioning apparatus, an office apparatus, a vending machine, and other household apparatuses.

Furthermore, the terminal apparatus may collectively refer to a mobile-type or fixed-type user equipment, such as User Equipment (UE), a Mobile Station (MS) (Mobile Terminal (MT)), a mobile station apparatus, a mobile terminal, a subscriber unit, a subscriber station, a wireless terminal, a mobile device, a node, a device, a remote station, a remote terminal, a wireless communication device, a wireless communication apparatus, a user agent, and an access terminal.

Furthermore, the base station apparatus may collectively refer to an arbitrary node on a network terminal that communicates with the terminal, such as a NodeB, an enhanced NodeB (eNodeB), a base station, and an Access Point (AP). Moreover, the base station apparatus may include a Remote Radio Head (RRH) (which is also referred to as Remote Radio Unit (RRU), a remote antenna, or a distributed antenna).

The embodiments of the invention are described in detail above referring to the drawings, but the specific configuration is not limited to the embodiments and includes an amendment to a design that falls within a scope not deviating from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is mentioned according to each of the embodiments is also included in the technical scope of the present invention.

INDUSTRIAL APPLICABILITY

The present invention can be applied to a mobile phone, a personal computer, a tablet computer, and the like.

DESCRIPTION OF REFERENCE NUMERALS 1 (1A, 1B, 1C) TERMINAL APPARATUS
3 BASE STATION APPARATUS
101 HIGHER-LAYER PROCESSING UNIT
103 CONTROL UNIT
105 RECEIVING UNIT
107 TRANSMITTING UNIT
109 TRANSMISSION POWER PROCESSING UNIT
301 HIGHER-LAYER PROCESSING UNIT
303 CONTROL UNIT
305 RECEIVING UNIT
307 TRANSMITTING UNIT
1011 RADIO RESOURCE CONTROL UNIT
1013 SUBFRAME SETTING UNIT
1015 SCHEDULING INFORMATION INTERPRETATION UNIT
1017 TRANSMISSION POWER CONTROL UNIT
3011 RADIO RESOURCE CONTROL UNIT
3013 SUBFRAME SETTING UNIT
3015 SCHEDULING UNIT
3017 TRANSMISSION POWER CONTROL UNIT

The invention claimed is:

1. A terminal apparatus that communicates with a base station apparatus, the terminal apparatus comprising:
higher-layer processing circuitry that receives:
using higher-layer signaling, first information indicating whether a subframe belongs to a first subframe set or a second subframe set,
using higher-layer signaling, second information indicating a first parameter value, the first parameter value being used for setting of transmission power for transmission of a physical uplink shared channel,
using higher-layer signaling, third information indicating a second parameter value, the second parameter value being used for setting of the transmission power for the transmission of the physical uplink shared channel, and
using higher-layer signaling, fourth information indicating whether a transmission power control command accumulation is enabled or disabled, a third parameter value and a fourth parameter value being given based on the fourth information; and transmission power processing circuitry that computes a power headroom:

using a first set of parameter values and a downlink pathloss estimate that is calculated in the terminal apparatus, in a case that the subframe belongs to the first subframe set, and using a second set of parameter values and the downlink pathloss estimate, in a case that the subframe belongs to the second subframe set, wherein the first set of parameter values includes the first parameter value and the third parameter value, the first parameter value is multiplied with the downlink pathloss estimate, the second set of parameter values includes the second parameter value and the fourth parameter value, and the second parameter is multiplied with the downlink pathloss estimate.

2. The terminal apparatus according to claim 1, wherein a serving cell that is used to calculate the downlink pathloss estimate is configured using the higher-layer signaling.

3. The terminal apparatus according to claim 1, wherein in a case that transmission on a dynamically-scheduled physical uplink-shared channel is performed in the subframe for a serving cell, the power headroom is calculated using the first set of parameter values and the downlink pathloss estimate, or the second set of parameter values and the downlink pathloss estimate.

4. A base station apparatus that communicates with a terminal apparatus, the base station apparatus comprising:

higher-layer processing circuitry that transmits:

using higher-layer signaling, first information indicating whether a subframe belongs to a first subframe set or a second subframe set, using higher-layer signaling, second information indicating a first parameter value, the first parameter value being used for setting of transmission power for transmission of a physical uplink shared channel, using higher-layer signaling, third information indicating a second parameter value, the second parameter value being used for setting of the transmission power for the transmission of the physical uplink shared channel, and using higher-layer signaling, fourth information indicating whether a transmission power control command accumulation is enabled or disabled, a third parameter value and a fourth parameter value being given based on the fourth information; and receiving circuitry that receives a power headroom for the subframe, wherein the power headroom is computed using a first set of parameter values and a downlink pathloss estimate that is calculated in the terminal apparatus, in a case that the subframe belongs to the first subframe set, the power headroom is computed using a second set of parameter values and the downlink pathloss estimate that is calculated in the terminal apparatus, in a case that the subframe belongs to the second subframe set, the first set of parameter values includes the first parameter value and the third parameter value, the first parameter value is multiplied with the downlink pathloss estimate, the second set of parameter values includes the second parameter value and the fourth parameter value, and the second parameter is multiplied with the downlink pathloss estimate.

5. A communication method for use in a terminal apparatus that communicates with a base station apparatus, the method comprising:

receiving, using higher-layer signaling, first information indicating whether a subframe belongs to a first subframe set or a second subframe set, using higher-layer signaling, second information indicating a first parameter value, the first parameter value being used for setting of transmission power for transmission of a physical uplink shared channel, using higher-layer signaling, third information indicating a second parameter value, the second parameter value being used for setting of the transmission power for the transmission of the physical uplink shared channel, and using higher-layer signaling, fourth information indicating whether a transmission power control command accumulation is enabled or disabled, a third parameter value and a fourth parameter value being given based on the fourth information;

computing a power headroom using a first set of parameter values and a downlink pathloss estimate that is calculated in the terminal apparatus, in a case that the subframe belongs to the first subframe set, and computing a power headroom using a second set of parameter values and the downlink pathloss estimate, in a case that the subframe belongs to the second subframe set, wherein the first set of parameter values includes the first parameter value and the third parameter value, the first parameter value is multiplied with the downlink pathloss estimate, the second set of parameter values includes the second parameter value and the fourth parameter value, and the second parameter is multiplied with the downlink pathloss estimate.

6. A communication method for use in a base station apparatus that communicates with a terminal apparatus, the method comprising:

transmitting, using higher-layer signaling, first information indicating whether a subframe belongs to a first subframe set or a second subframe set, using higher-layer signaling, second information indicating a first parameter value, the first parameter value being used for setting of transmission power for transmission of a physical uplink shared channel, using higher-layer signaling, third information indicating a second parameter value, the second parameter value being used for setting of the transmission power for the transmission of the physical uplink shared channel, and using higher-layer signaling, fourth information indicating whether a transmission power control command accumulation is enabled or disabled, a third parameter value and a fourth parameter value being given based on the fourth information; and receiving a power headroom for the subframe, wherein the power headroom is computed using a first set of parameter values and a downlink pathloss estimate that is calculated in the terminal apparatus, in a case that the subframe belongs to the first subframe set, the power headroom is computed using a second set of parameter values and the downlink pathloss estimate that is calculated in the terminal apparatus, in a case that the subframe belongs to the second subframe set, the first set of parameter values includes the first parameter value and the third parameter value,
the first parameter value is multiplied with the downlink pathloss estimate,
the second set of parameter values includes the second parameter value and the fourth parameter value, and
the second parameter is multiplied with the downlink pathloss estimate.

7. An integrated circuit mountable on a terminal apparatus that communicates with a base station apparatus, the integrated circuit comprising:
a processor; and
a memory; wherein
the processor executes a program stored in the memory to cause the terminal apparatus to perform at least functions of:
receiving, using higher-layer signaling, first information indicating whether a subframe belongs to a first subframe set or a second subframe set,
using higher-layer signaling, second information indicating a first parameter value, the first parameter value being used for setting of transmission power for transmission of a physical uplink shared channel,
using higher-layer signaling, third information indicating a second parameter value, the second parameter value being used for setting of the transmission power for the transmission of the physical uplink shared channel, and
using higher-layer signaling, fourth information indicating whether a transmission power control command accumulation is enabled or disabled, a third parameter value and a fourth parameter value being given based on the fourth information;
computing a power headroom using a first set of parameter values and a downlink pathloss estimate that is calculated in the terminal apparatus, in a case that the subframe belongs to the first subframe set, and
computing a power headroom using a second set of parameter values and the downlink pathloss estimate, in a case that the subframe belongs to the second subframe set, wherein
the first set of parameter values includes the first parameter value and the third parameter value,
the first parameter value is multiplied with the downlink pathloss estimate,
the second set of parameter values includes the second parameter value and the fourth parameter value, and
the second parameter is multiplied with the downlink pathloss estimate.

8. An integrated circuit mountable on a base station that communicates with a terminal apparatus, the integrated circuit comprising:
a processor; and
a memory; wherein
the processor executes a program stored in the memory to cause the base station apparatus to perform at least functions of:
transmitting, using higher-layer signaling, first information indicating whether a subframe belongs to a first subframe set or a second subframe set,
using higher-layer signaling, second information indicating a first parameter value, the first parameter value being used for setting of transmission power for transmission of a physical uplink shared channel,
using higher-layer signaling, third information indicating a second parameter value, the second parameter value being used for setting of the transmission power for the transmission of the physical uplink shared channel, and
using higher-layer signaling, fourth information indicating whether a transmission power control command accumulation is enabled or disabled, a third parameter value and a fourth parameter value being given based on the fourth information; and
receiving a power headroom for the subframe, wherein
the power headroom is computed using a first set of parameter values and a downlink pathloss estimate that is calculated in the terminal apparatus, in a case that the subframe belongs to the first subframe set,
the power headroom is computed using a second set of parameter values and the downlink pathloss estimate that is calculated in the terminal apparatus, in a case that the subframe belongs to the second subframe set,
the first set of parameter values includes the first parameter value and the third parameter value,
the first parameter value is multiplied with the downlink pathloss estimate,
the second set of parameter values includes the second parameter value and the fourth parameter value, and
the second parameter is multiplied with the downlink pathloss estimate.

* * * * *